(12) United States Patent
Akkiraju et al.

(10) Patent No.: US 8,516,435 B2
(45) Date of Patent: Aug. 20, 2013

(54) SYSTEM AND METHOD FOR GENERATING IMPLEMENTATION ARTIFACTS FOR CONTEXTUALLY-AWARE BUSINESS APPLICATIONS

(75) Inventors: Rama Kalyani T. Akkiraju, San Jose, CA (US); Manisha Dattatraya Bhandar, Yorktown Heights, NY (US); Pankaj Dhoolia, Uttar Pradesh (IN); Shiwa Fu, Chappaqua, NY (US); Nilay Ghosh, West Bengal (IN); Tilak Mitra, Coconut Creek, FL (US); Rakesh Mohan, Cortlandt Manor, NY (US); Anil Nigam, Stamford, CT (US); Dipankar Saha, West Bengal (IN); Wei Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 12/142,040

(22) Filed: Jun. 19, 2008

(65) Prior Publication Data
US 2009/0319981 A1 Dec. 24, 2009

(51) Int. Cl.
*G06F 9/44* (2006.01)
*G06F 9/45* (2006.01)

(52) U.S. Cl.
USPC ............ 717/104; 717/106; 717/140; 717/162

(58) Field of Classification Search
None
See application file for complete search history.

(56) References Cited

U.S. PATENT DOCUMENTS

| | | | |
|---|---|---|---|
| 7,444,625 B2 * | 10/2008 | Anwar et al. | 717/140 |
| 7,533,376 B2 * | 5/2009 | Anwar et al. | 717/162 |
| 7,617,479 B2 * | 11/2009 | Hambrick et al. | 717/104 |
| 7,703,085 B2 * | 4/2010 | Poznanovic et al. | 717/140 |
| 7,761,844 B2 * | 7/2010 | Bove et al. | 717/106 |
| 7,934,206 B2 * | 4/2011 | Butler et al. | 717/140 |
| 8,027,948 B2 | 9/2011 | Akkiraju et al. | |
| 8,127,270 B1 * | 2/2012 | Jerman et al. | 717/104 |
| 8,141,069 B2 | 3/2012 | Koehler | |
| 2002/0147606 A1 | 10/2002 | Hoffmann et al. | |
| 2003/0074648 A1 * | 4/2003 | Brassard et al. | 717/104 |
| 2004/0249645 A1 * | 12/2004 | Hauser et al. | 705/1 |
| 2005/0080609 A1 | 4/2005 | Bhaskaran et al. | |
| 2005/0080640 A1 | 4/2005 | Bhaskaran et al. | |
| 2006/0064667 A1 * | 3/2006 | Freitas | 717/104 |
| 2006/0101387 A1 * | 5/2006 | Gerken et al. | 717/106 |
| 2006/0106626 A1 * | 5/2006 | Jeng et al. | 705/1 |
| 2006/0130008 A1 * | 6/2006 | Nguyen et al. | 717/136 |

(Continued)

OTHER PUBLICATIONS

Anneke Kleppe, MDA Explained: The Model Driven Architecture: Practive and Promise, Apr. 21, 2003, ISBN-13 978-0-321-19442-8, chapters 4, 5, 6, 8, and 10.*

(Continued)

*Primary Examiner* — Thuy Dao
*Assistant Examiner* — Mongbao Nguyen
(74) *Attorney, Agent, or Firm* — Cantor Colburn LLP; William Stock

(57) ABSTRACT

A method for generating implementation artifacts for contextually-aware business applications includes utilizing a platform independent model (PIM) of a business application; generating a platform specific model (PSM) from the PIM, wherein the generating of a PSM includes one or more transformations between one or more meta-models of the PIM and one or more meta-models of the generated PSM; generating implementation artifacts; and binding the generated implementation artifacts with any existing services of the business application.

19 Claims, 20 Drawing Sheets

(56) References Cited

U.S. PATENT DOCUMENTS

| | | | |
|---|---|---|---|
| 2006/0130009 | A1 | 6/2006 | Cornell et al. |
| 2006/0130011 | A1 | 6/2006 | Cornell et al. |
| 2006/0174222 | A1* | 8/2006 | Thonse et al. ............... 717/106 |
| 2006/0242195 | A1 | 10/2006 | Bove et al. |
| 2007/0118551 | A1 | 5/2007 | Akkiraju et al. |
| 2007/0226681 | A1 | 9/2007 | Thorup |
| 2007/0288222 | A1 | 12/2007 | Eilam et al. |
| 2007/0288286 | A1* | 12/2007 | Linehan ............................ 705/9 |
| 2008/0127049 | A1* | 5/2008 | Elaasar ........................ 717/104 |
| 2008/0229276 | A1 | 9/2008 | Koehler et al. |
| 2008/0276229 | A1 | 11/2008 | Hawkins et al. |
| 2009/0150860 | A1 | 6/2009 | Gschwind et al. |
| 2009/0164985 | A1* | 6/2009 | Balko et al. ................... 717/162 |
| 2009/0319981 | A1 | 12/2009 | Akkiraju et al. |
| 2010/0077386 | A1 | 3/2010 | Akkiraju et al. |
| 2011/0161922 | A1 | 6/2011 | Geren |
| 2012/0042299 | A1 | 2/2012 | Perrin et al. |
| 2012/0110545 | A1 | 5/2012 | Jerman et al. |

OTHER PUBLICATIONS

Choong Koon Fong, Successful Implementation of Model Driven Architecture, A Borland White Paper, Jun. 2007, pp. 1-16.*

Anneke Kleppe, MDA Explanied: The Model Driven Architecture: Practice and Promise, Apr. 21, 2003, ISBN-13 978-0-321-19442-8, chapters 4, 5, 6, 8 and 10.*

Choong Koon Fong, Successful Implementation of Model Driven Architecture, A Borland White Paper, Jun. 2007, p. 1-16.*

A.Z. Javed, Automated Generation of Test Case Using Model-Driven Architecture, 0-7695-2971-2/07 IEEE, 2007, pp. 1-7.*

Choong Koon Fong, Quick Start Guide to MDA, A Primer to Model-Driven Architecture Using Borland Together Technologies, A Borland White Paper, Sep. 2006.*

Mariano Belaunde, MDA Guide Version 1.0.1, 2003, pp. (2-3) - (2-7), (3-1) - (3-8) and (5-1) - (5-3).*

Igor Sacevski, Introduction to Model Driven Architecture (MDA), 2007, Department of Computer Science University of Salzburg, pp. 3-11.*

John D. Poole, Model-Driven Architecture: Vision, Standards and Emerging Technologies, 2001, pp. 3-13.*

Chang Liu, Platform-Independent and Tool-Neutral Test Descriptions for Automated Software Testing, ICSE, 2000, Limerick, Ireland.

Brahim Medjahed et al., Business-to-Business Interactions: Issues and Enabling Technologies, The VLDB Journal (2003) 12: 59-85/ Digital Object Indentifier (DOI) 10.1007/s00778-003-0087-z.

Andreas Billig et al., Platform Independent Model Transformation Based on Triple, H.-A. Jacobsen (Ed.): Middleware 2004, LNCS 3231, pp. 493-511, 2004.

Jon Siegel, Ph.D., Why Use the Model Driven Architecture to Design and Build Distributed Applications?, ICSE'05, May 15-21, 2005, St. Louis Missouri, USA.

Rama Akkiraju et al., Searching Service Repositories by Combining Semantic and Ontological Matching, IBM Watson Research Center, 19 Skyline Drive, Hawthorne, NY, 2005.

Rama Akkiraju et al., SEMAPLAN: Combining Planning with Semantic Matching to Achieve Web Service Composition, IBM Watson Research Center, 19 Skyline Drive, Hawthorne, NY, American Association for Artificial Intelligence, 2005.

Arsanjani et al., "SOMA: A method for developing service-oriented solutions", Aug. 6, 2008, IBM Systems Journal, vol. 47, No. 3, pp. 377-396 <http://www.cs.jyu.fi/el/tjtse54_98.Artikkelit/ArsanjaniEtAlIBMSsJ.pdf>.

Hazra, Tushar K., "MDA brings standards-based modeling to EAI teams", May 1, 2002, adtmag.com, pp. 1-5 <http://adtmag.com/articles/2002/05/01/mda-brings-standardsbased-modeling-to-eai-teams.aspx>.

He et al., "Constructing Platform Independent Models of Web Application", 2005 IEEE, SOSE'05, pp. 1-5 <http://ieeexplore.ieee.org/xpls/abs_all.jsp?arnumber=1551133&tag+1>.

Office Action—Non-Final for U.S. Appl. No. 12/206,950, filed Sep. 9, 2008; First Named Inventor: Rama Kalyani T. Akkiraju; Mailing Date: Mar. 13, 2012.

Agarwal et al, "A Service Creation Environment Based on End to End Composition of Web Services", 2005 ACM, WWW 2005, May 10-14, 2005, Chiba, Japan, pp. 128-137; <http://dl.acm.org/citation.cfm?id=1060745.1060768&coli=DL&dl=GUIDE&CFID-188423796&CFTOKEN=27139582>.

Akkiraju, et al, "Toward the Development of Cross-platform Business Applications via Model-driven Transformations", 2009 IEEE, pp. 582-592; <http://ieeexplore.ieee.org/stamp/stamp.js?tp=arnumber=5190690>.

Chabaane et al, "From Platform Independent Service Compostion Model in BPMN4SOA to Executable Service Compositions", 2010 ACM, iiWAS2010, Nov. 8-10, 2010, Paris, France, pp. 653-656; <http://dl.acm.org/citation.cfm?id-1967588>.

Koehler et al, "A Model-Driven Transformation Method", 2003 IEEE, EDOC'03, pp. 1-12; <http://ieeexplore.ieee.org/stamp/stamp.jsp?tp=&arnumber=1233848>.

Nguyen et al, "Agile Development of Platform Independent Model in Model Driven Architecture", 2010 IEEE, pp. 344-347; <http://ieeexplore.ieee.org/stamp/stamp.jsp?tp=&arnumber=5513837>.

Rozanc et al, "Producing the Platform Independent Model of an Existing Web Application", 2012 IEEE, pp. 1341-1348; <http://proceedings.fedcsis.org/2012/pliks/276.pdf>.

Telea, "Reverse Engineering—Recent Advances and Applications", 2012 In Tech, Croatia, pp. 1-290; <http://www.cs.rug.nl/~alext/PAPERS/InTech12/book.pdf>.

Non-Final Office Action dated Mar. 28, 2012 for U.S. Appl. No. 12/235,214.

Siegel, Jon. "Using OMG•s Model Driven Architecture (MDA) to Integrate Web Services." Object Management Group. May 2002, pp. 1-9.

Wadsack, Jörg P., and Jens H. Jahnke. "Towards model-driven middleware maintenance." OOPSLA conference on Object Oriented Programming, Systems, Languages and Applications. 2002, pp. 1-6.

* cited by examiner

SYSTEM AND METHOD FOR GENERATING IMPLEMENTATION ARTIFACTS FOR CONTEXTUALLY-AWARE BUSINESS APPLICATIONS

BACKGROUND

The present invention relates generally to the implementation of business services and, more particularly, to a system and method for generating implementation artifacts for contextually-aware business applications.

IT services companies are increasingly focusing their efforts on building reusable solutions rather than building point solutions to individual clients which tend to be expensive and time consuming. For example, major pieces of solutions such as Request for Quote, First Notice of Loss for insurance industry and Trade Promotions Management for distribution industry are being developed ahead of time internally on choice platforms and are then being customized for specific client needs upon winning a deal. IT services companies see this as a way to deliver solutions quickly and cost effectively to their clients.

However, there are challenges to be overcome even with this reusable solution approach. One of the main challenges is that these pre-built solutions still need varying amounts of customization at each client environment. This is so because every client has a unique combination of packaged vendor solutions (e.g., SAP, Oracle) and legacy applications and would prefer specific middleware platforms (such as IBM WebSphere platform, Oracle/BEA platform, SAP NetWeaver platform etc). The solution has to be customized to work with the existing environment on the choice platform of the client and be integrated with its specific legacy applications. The key question in this setting is: how can IT services companies develop solutions on one platform and then adapt them to individual client settings with varied IT environments and platforms more effectively and efficiently than developers doing it manually?

Model driven architecture (MDA) and model driven development (MDD) approaches proposed by OMG postulate that a key aspect of building reusable solutions is developing reusable models. According to this approach, the functional specification of a new business solution can be described formally in a platform independent model (PIM) and can be translated to a platform specific model (PSM). This platform specific model can then be translated into implementation artifacts such as code and database schema that pertain to that target platform via fully or partially automated model-driven transformations. The emphasis is on building full and complete formal models in modeling languages such as UML. Several model-driven transformations can then be applied to translate these models into implementation artifacts. MDA also talks about reverse engineering models from implementation artifacts to some extent although most commercial MDA tools tend to support forward transformations more naturally than the reverse transformations.

MDA approach has been applied to generate implementation artifacts from platform independent models in the past with varying degrees of success. Among the criticisms of the MDD approach is that it assumes that complete and formal models can be created upfront for any given application and that the meta-models of the target platforms are available. In addition, it does not say much about how the generated implementation artifacts can/should work with the existing legacy systems on a given client platform. For example, if a client already has an SAP ERP system to maintain customer accounts, regenerating implementation artifacts to create and maintain such information is not practical. When building new or changed business applications leveraging existing functionality that reflects the client's context is critical.

Some aspects of model driven development have been looked at by research efforts such as the Model-Driven Business Transformation (MDBT), which is one example of the known Model-Driven Development (MDD) approach. MDBT effort has been successful within the context of its scope. However, MDBT efforts have focused either only on transforming a platform independent model to platform specific artifacts without much consideration for the existing client context, or on transforming a platform independent model to a single platform.

What is needed is a model-driven approach to generate implementation artifacts for a target platform from a given platform independent model while taking into account the existing assets/code/services that can be leveraged. By generating artifacts that are well-informed about and bound where appropriate with clients' existing functionality and assets, the system and method of the present invention helps cut down the development time during project implementations, thereby resulting in reduced project durations and costs.

SUMMARY

The foregoing discussed drawbacks and deficiencies of the prior art are overcome or alleviated, in an exemplary embodiment, by a method for generating implementation artifacts for contextually-aware business applications, the method including utilizing a platform independent model (PIM) of a business application; generating a platform specific model (PSM) from the PIM, wherein the generating of a PSM includes one or more transformations between one or more meta-models of the PIM and one or more meta-models of the generated PSM; generating implementation artifacts; and binding the generated implementation artifacts with any existing services of the business application.

In another embodiment, a computer program product includes a computer readable computer program code for generating implementation artifacts for contextually-aware business applications; and instructions for causing a computer to implement a method, the method further including utilizing a platform independent model (PIM) of a business application; generating a platform specific model (PSM) from the PIM, wherein the generating of a PSM includes one or more transformations between one or more meta-models of the PIM and one or more meta-models of the generated PSM; generating implementation artifacts; and binding the generated implementation artifacts with any existing services of the business application.

A system for generating implementation artifacts for contextually-aware business applications includes a computing network including a processing device in communication with one or more computer memory storage devices; and the computing network further configured to implement a method for generating implementation artifacts for contextually-aware business applications, the method further including utilizing a platform independent model (PIM) of a business application; generating a platform specific model (PSM) from the PIM, wherein the generating of a PSM includes one or more transformations between one or more meta-models of the PIM and one or more meta-models of the generated PSM; generating implementation artifacts; and binding the generated implementation artifacts with any existing services of the business application.

BRIEF DESCRIPTION OF THE DRAWINGS

Referring to the exemplary drawings wherein like elements are numbered alike in the several Figures:

FIG. 3, including

FIG. 4, including

FIG. 5, including

FIG. 11, including

DETAILED DESCRIPTION

Figure 1:
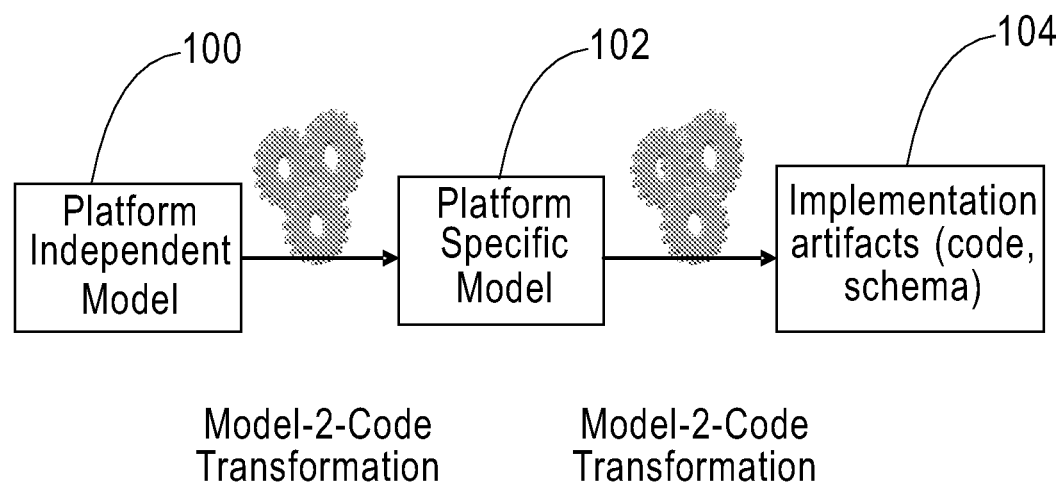
FIG. 1 is a block diagram of a method according to an exemplary embodiment of the present invention for generating implementation artifacts from a platform independent model.

Disclosed herein is a system and method for generating implementation artifacts for contextually-aware business applications. Briefly stated, a model driven technique to generate implementation artifacts on a target platform from platform independent models while leveraging the existing assets in a client environment includes applying semantic Web service matching technology to achieve automatic binding of generated artifacts with available client assets. The generated implementation artifacts on the target platform leverage existing client assets in the target environment. The ability to leverage existing assets in the target environment makes the generated business application implementation artifacts "contextually-aware." By generating implementation artifacts that are well informed about and bound where appropriate with clients' existing functionality, the invention helps reduce the development time during project implementations, thereby resulting in reduced project durations and costs.

Model driven development (MDD) and code generation from models is known. The notion of a layered model driven architecture evolved from the Object Management Group (OMG). In OMG's view, models expressed in a well-defined notation are cornerstones to understanding systems for enterprise-scale solutions. Development of enterprise systems is viewed as an organization of a set of models built using a series of transformations between various levels of models. Building automated transformations between models is made possible by creating transformation rules between the meta-models of the expressed models. Given two meta-models (e.g., a source meta-model and a target meta-model) and the transformation rules that can transform the source meta-model into the target meta-model, transformations can be built using tools offered by various tool vendors. Using these transformations, a PIM can be translated into a PSM and the PSM can then be translated into various implementation artifacts on the target platform. Tool vendors (e.g., IBM's Rational Software Architect—"RSA") support transformation authoring, code generation in general, and also provide ready-made transformations from recommended PIM languages such as UML to their specific platforms, e.g., an IBM WebSphere platform.

The MDA approach comprises several steps apart from the model creation and transformation authoring aspects discussed above. MDA envisions model creation, analysis, transformation, composition, testing, simulation, extraction, and metadata management as important aspects of model driven development. Many commercially available vendor tools provide support for some or all of these aspects to varying degrees. Generating implementation artifacts from models via transformations is referred to as forward engineering. Extraction of models from code and legacy is termed reverse engineering.

Service Oriented Architecture (SOA) is a paradigm that uses a set of principles, policies, best practices, guidelines and technology capabilities to build IT systems (e.g., applications, infrastructure, etc.) that align with the business strategies and imperatives of an enterprise. In SOA, autonomous, loosely coupled and coarse-grained services with well-defined interfaces provide business functionality that can be discovered and accessed through a supportive infrastructure. This allows internal and external system integration as well as the flexible reuse of application logic through the composition of services supporting end-to-end business processes.

Different companies and schools of thoughts have developed various mechanisms and viewpoints on how to use the principles, best practices and guidelines of SOA to build well defined, consistent and complete models which are resilient to changes and adequately represent the solution to the problem domain. One such a school of thought from IBM is called Service Oriented Modeling and Architecture (SOMA). SOMA is a service oriented modeling and design technique that provides prescriptive guidance on how to develop a robust, scalable SOA solution aimed at enabling target business processes. At the heart of SOMA are the identification, specification and realization of business-aligned services that form the foundation for an SOA solution. During the identification phases, the technique applies a filtering mechanism by which it only identifies those services, from the candidate service list, that will be exposed. During the specification phase, the method provides prescriptive guidance and techniques on how to design the services—input and output messages, non-functional requirements and how to support them, dependencies of services on other services and technical components, composition of services to realize part or whole of a business process and how services are implemented through service components, functional components and technical components. The realization phases of the method provide specific techniques to identify design and implementation decisions prescribing how to implement all the designed services to form a complete end-to-end SOA solution. In a sense, SOA enabled by the SOMA method provides higher level of abstractions during the building of platform independent models in the MDD technique. From this perspective, SOA elevates MDD to a higher level of abstraction thereby enabling the models to be linked with business objectives.

The objective of forward engineering activities is to generate implementation artifacts from formal models. Creating formal models is the starting point for this approach. Referring to FIG. 1, there illustrated in simplified block diagram form is an exemplary embodiment of a method for generating implementation artifacts from a platform independent model. The functional specification of a business application is modeled at a platform independent level in UML in a block 100. This formal PIM is then translated into a platform specific model in a block 102 using a model-to-model transformation. The generated PSM is then converted into various implementation artifacts such as code and database schema via a model-to-code transformation in a block 104.

In the process of creating platform independent models, it is assumed that a Computation Independent Model (CIM) exists. Thus, the starting point is the creation of a PIM. Model creation, transformation, and composition principles of MDA are used in building platform independent models. IBM's RSA tool may be used for model creation. IBM's SOMA method and the corresponding tool, SOMA-ME (SOMA Modeling Environment), may be used to model the PIM and enhance it with user experience models. PIM models are typically represented in UML.

In creating platform independent models, the objective is to model enough detail at the platform independent level to enable transformation of this model onto the target platforms of choice. In the present invention, the focus is on transformation of process models, user experience models, and the exposed (to external parties) application services. The detailed design that supports the functionality of application services is not explicitly modeled and addressed because commercial tools are already available to transform UML models of detailed design to Java J2EE and EJB models. The key issue in building platform independent models is identifying the necessary and sufficient set of common modeling elements to construct a PIM for composite business services such that a rich enough set of platform specific modeling elements can be created via translation (either fully or partly automatically) onto different platforms.

OMG provides some guidance on how to build platform independent models. Many tool vendors support the development of platform independent models. UML is the popular language of choice in the industry for representing platform independent models. In the present invention, the OMG modeling notions are enhanced in two ways. In the first way, a "service" is used as a first-class modeling construct instead of a "class" in building the structural models. A service is a higher-level abstraction than a class. A service exposes its interface signature, message exchanges and any associated metadata, and is often more coarse-granular than a typical class in an object-oriented paradigm. This notion of working with services rather than classes enables one to think of a business application as a composition of services. This higher-level abstraction is useful when deciding which model elements need to be transformed onto the target platforms and how to leverage existing assets in a client environment. This is so because the existing assets in a client environment can be wrapped as services with its associated metadata (if any) and can be rationalized with modeled services to ensure reuse of existing assets. It is more natural to do this rationalization at the level of services and their interfaces rather than at the level of classes. Operationally, a service is a class but conceptually it offers a higher level of abstraction. In the second way, the vocabulary to express the user experience modeling elements is defined using the "service" level abstractions. Several best practice models have been suggested about user experience modeling but no specific profile is readily available for use in expressing platform independent models. A profile is created that defines the language for expressing user experience modeling elements. These include stereotypes for information elements and layout elements. Information elements include screen, input form, and action elements that invoke services on the server side (called service actions) and those that invoke services locally on the client (non-service actions). Layout elements include text, table and chart elements.

Figure 2:
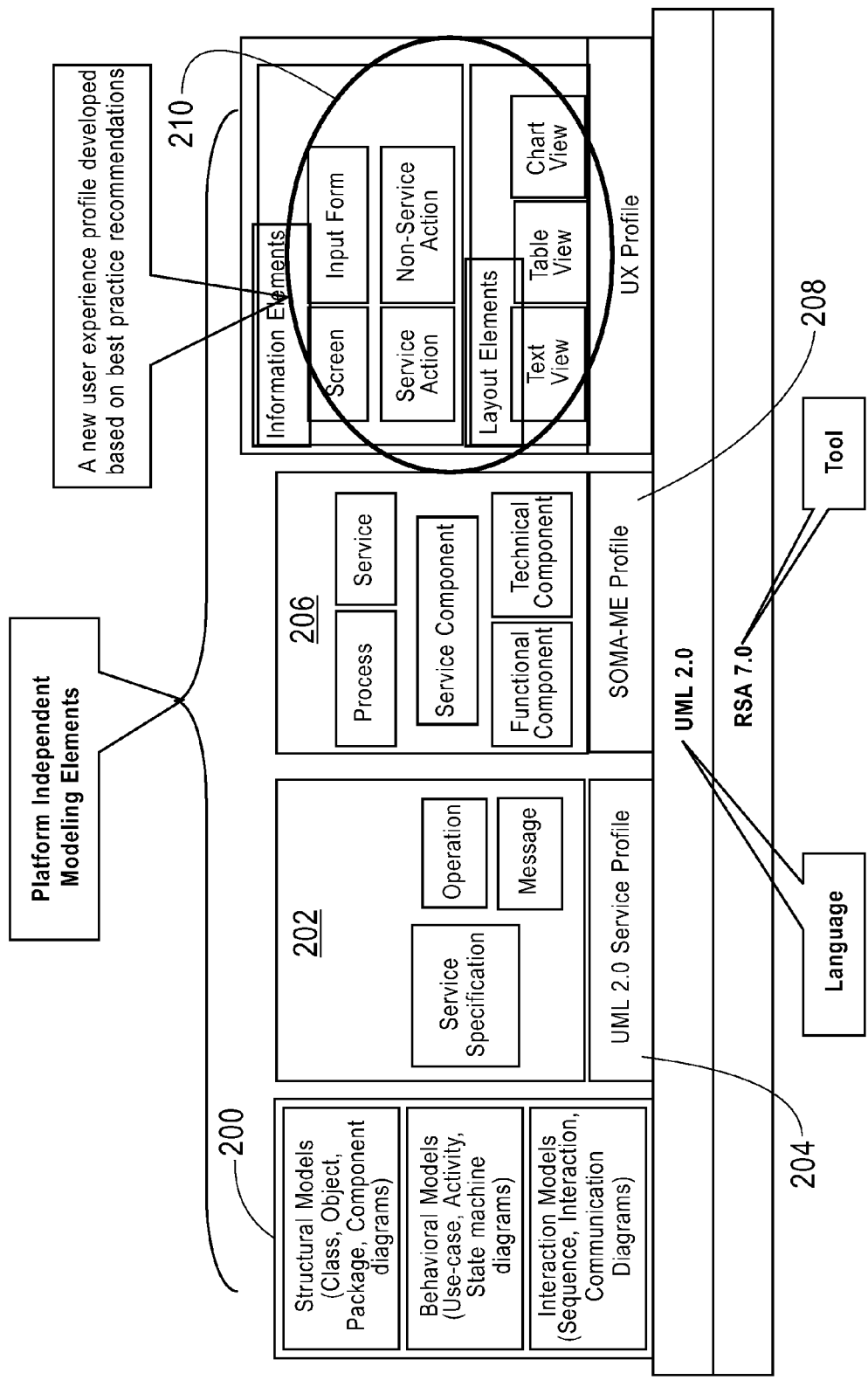
FIG. 2 is a layered diagram that illustrates a set of modeling elements used to build platform independent models of a given functional specification.

FIG. 2 illustrates a set of modeling elements used to build platform independent models of a given functional specification. To the left in FIG. 2 are the traditional UML 2.0 modeling constructs 200, namely the structural, behavioral and interaction models. These models are then elevated to a higher level of abstractions as services 202 using the UML 2.0 service profile 204 up on which additional modeling constructs 206 of SOMA-ME are built. The UML 2.0 service profile 204 and SOMA-ME profile 208 together provide the vocabulary needed to express the service level abstractions of the functional specifications. Finally, the new user experience profile 210 developed based on the best practice recommendations yields the vocabulary required to capture the user interface modules. From this, a PIM can be created.

In an exemplary embodiment of the present invention, a simple instance of a business solution that an IT services company may want to develop upfront and bring to market as a solution relates to trade promotions management. Trade promotions are incentives paid by consumer products manufacturers to retailers for merchandising support. Typically, a key account manager creates trade promotions after deciding which products need to be promoted. To accomplish this, the manager establishes "promotion groups" comprising groupings of products to be promoted. Once the promotion offer details are finalized, the manager submits these trade promotions for approval to a trade marketing manager. The trade marketing manager has the overall responsibility to manage the calendar of trade promotions being offered to each retailer each month. The trade marketing manager reviews the trade promotions submitted by the key account manager for a given retailer and approves or rejects the trade promotions as the case may be. Usually, creation of a trade promotion involves multiple parties and integration of many systems. These systems are often implemented by different vendors on different platforms. For example, a service that retrieves a list of all available products for promotion offering may already be available because a client may have an SAP ERP system. In such a case, when the trade promotions management solution is being deployed at the client site, to accomplish the product retrieval, the trade promotions management solution has to be integrated with the appropriate system interfaces of the SAP system. Each client's environment might be different. Another client might have some other system for offering the same function. In addition, some clients might prefer that their solutions be built on specific development and the corresponding runtime platforms such as the IBM WebSphere, Oracle/BEA, and SAP NetWeaver platforms for a number of reasons including the availability of in-house skills for project development and maintenance, availability of software licenses, and feature preference of the software. Therefore, IT services companies are faced with the challenge of balancing their desire to building complete solutions them during the project execution time with multiple client legacy systems the details of which cannot be known upfront.

Figure 3A:
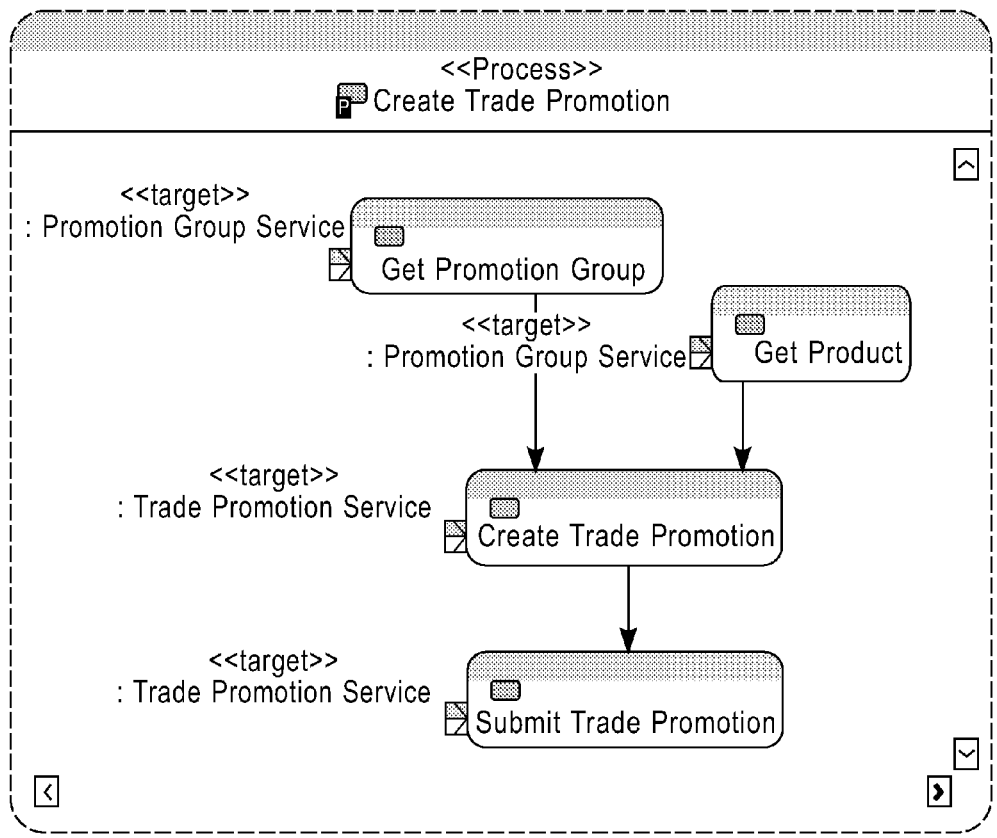
FIGS. 3a and 3b, illustrate the behavioral model of an exemplary trade promotions management scenario using activity diagrams.
Figure 3A:
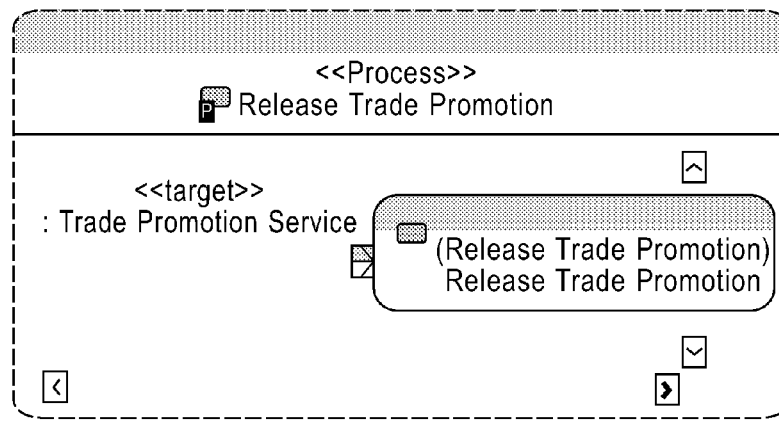
Figure 3B:
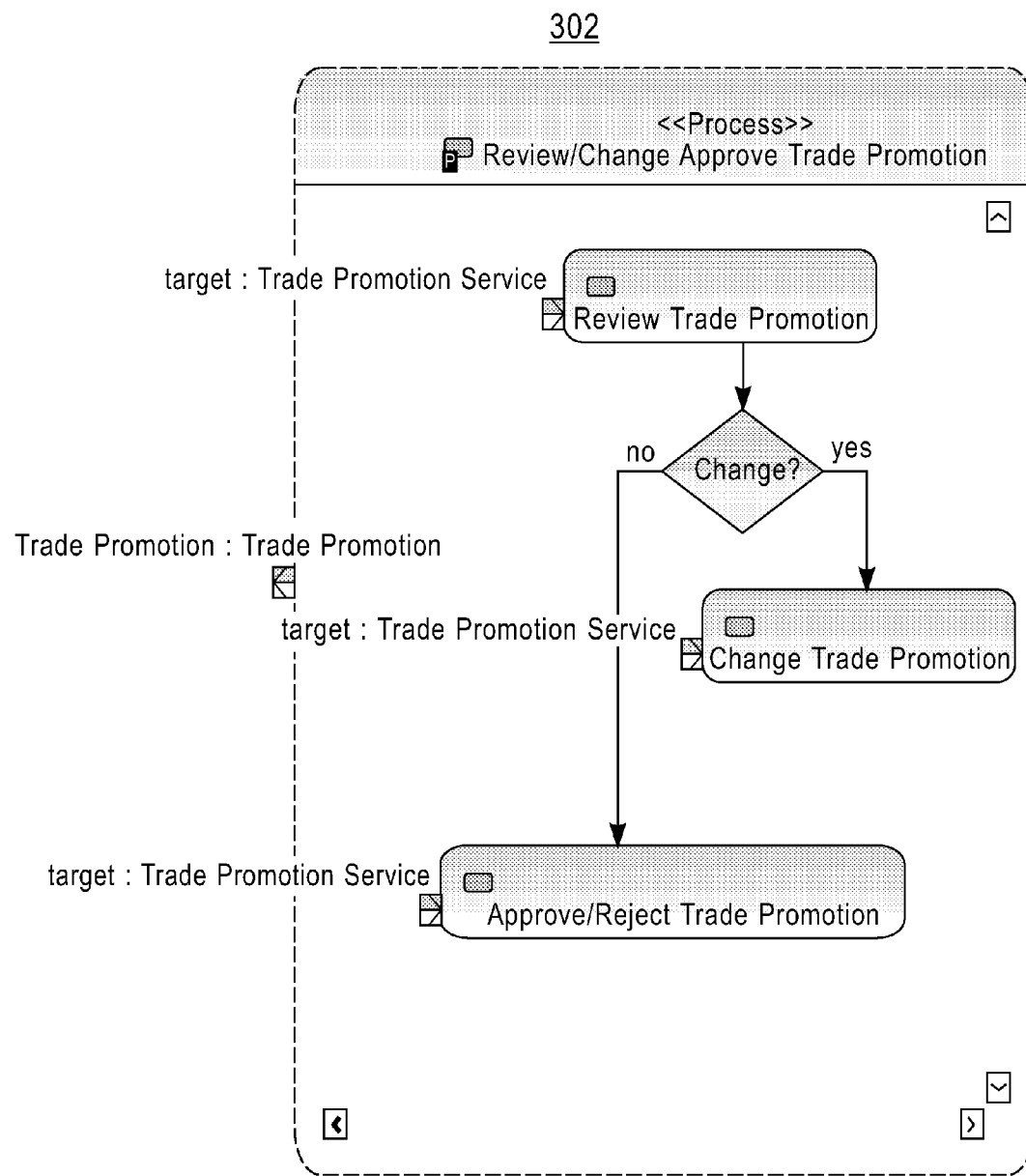

FIG. 3 illustrates the behavioral model of the trade promotions management scenario using upfront with the need to support these solutions on multiple platforms and to integrate activity diagrams. Specifically, FIG. 3a illustrates the creation of a trade promotion process 300 as performed by the key account manager. FIG. 3b illustrates the actions 302 performed by the trade marketing manager who reviews and approves the trade promotions.

Figure 4A:
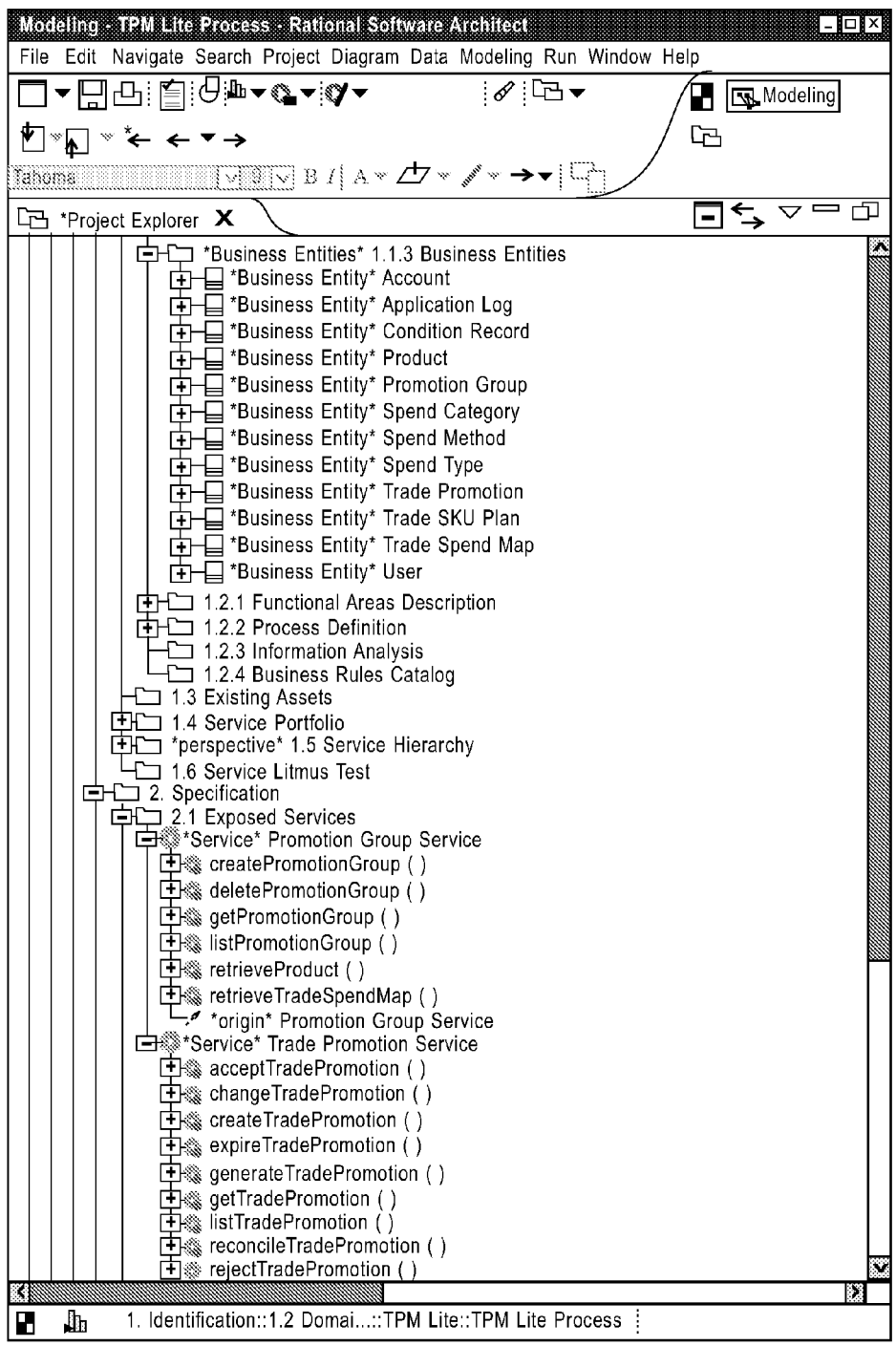
FIGS. 4a and 4b, illustrate the identification via process decomposition of the exposed services and business entities.
Figure 4B:
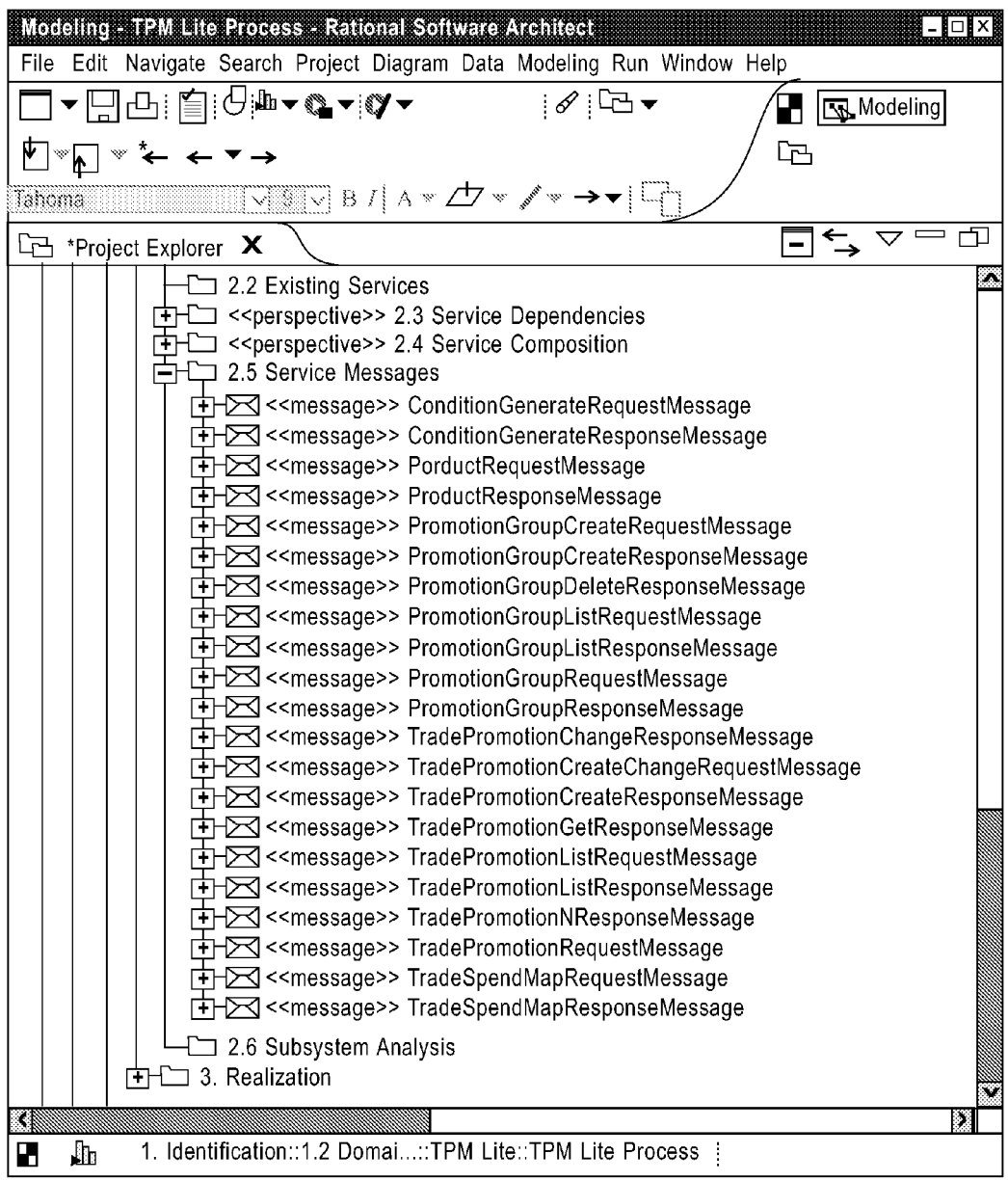
Figure 5A:
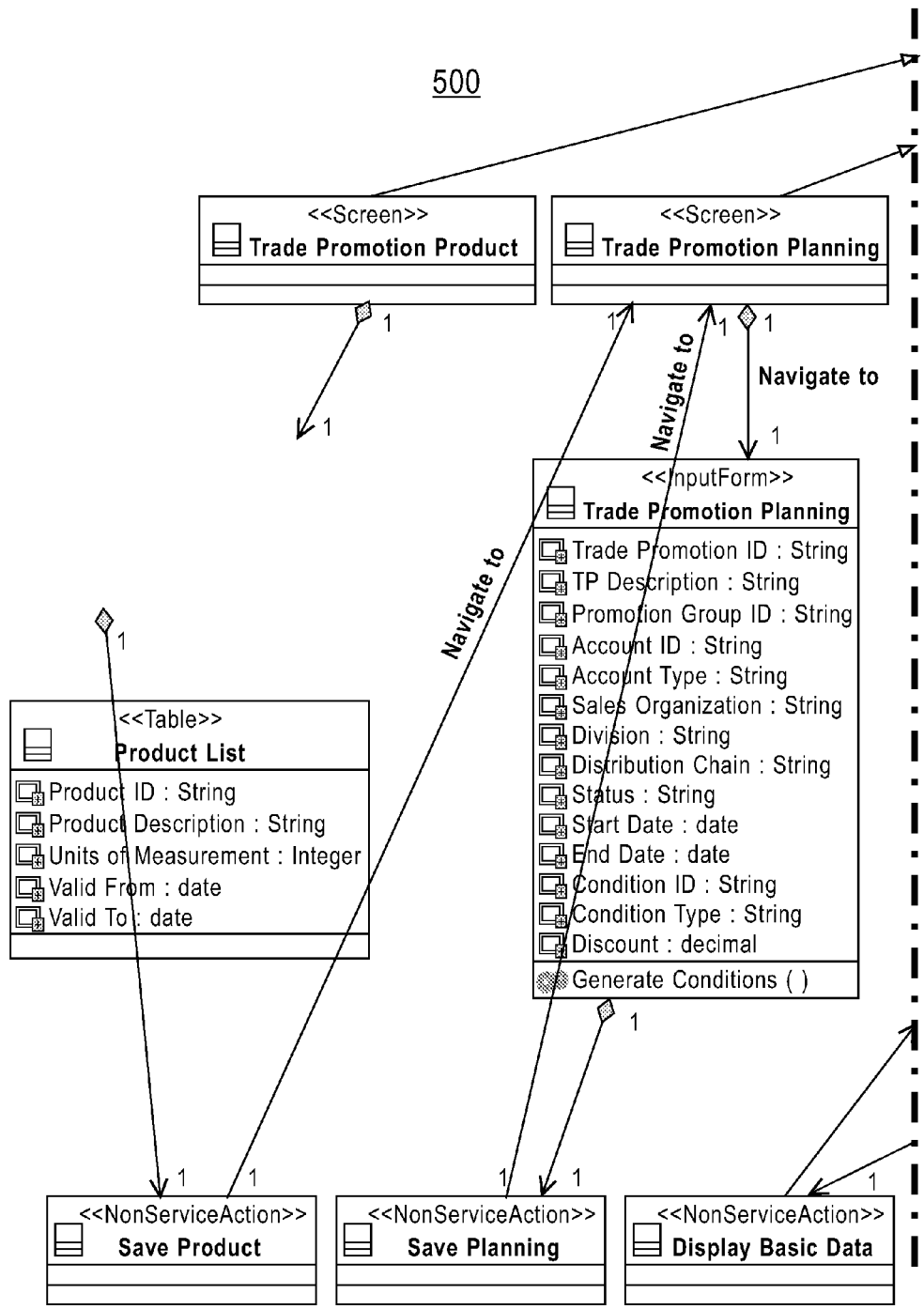
FIGS. 5a and 5b, show the user experience model of the exemplary trade promotions management scenario modeled using the vocabulary defined in a user experience profile.
Figure 5B:
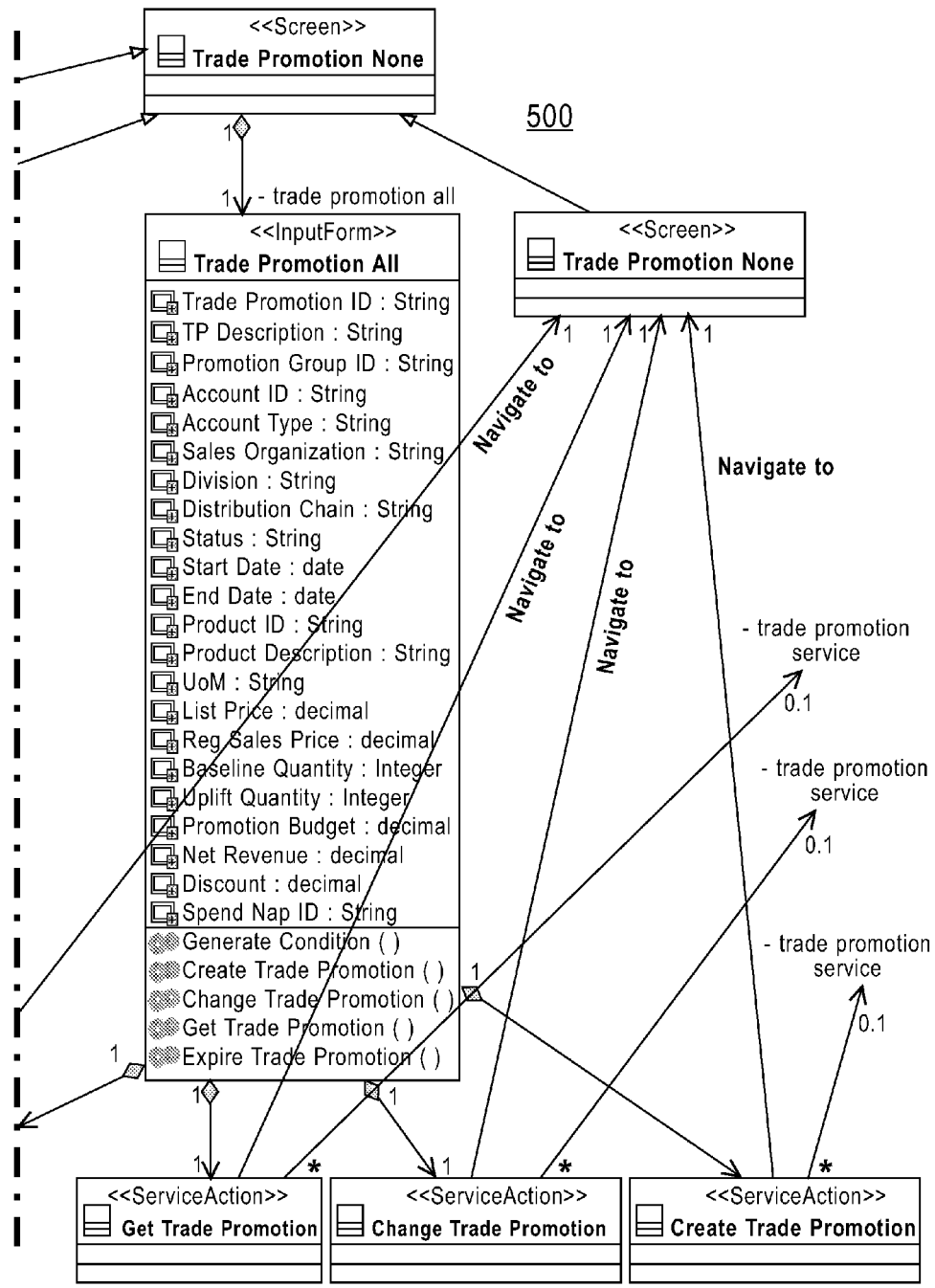

FIG. 4 illustrates the identification via process decomposition of the exposed services and business entities, which is a step in the SOMA method. Candidate services discovered via process decomposition are passed through a service litmus test according to the SOMA specification. Some of the candidate services may be deemed too low level during this phase and, as a result, are delegated to lower level technical or functional components while the remaining services are exposed as services. Specifically, FIG. 4a shows the business entities, services and their interfaces 400. FIG. 4b shows the messages 402 that are exchanged via the service interface. FIG. 5 shows the user experience model 500 of the trade promotions management scenario modeled using the vocabulary defined in the user experience profile.

Transformations create elements in a target model or domain based on elements from a source model. A model driven transformation is a set of mapping rules that define how elements in a given source model map to their corresponding elements in a target domain model. These rules are specified between the source and target platform meta-models. As shown in FIG. 1, depending on what needs to be generated there could be multiple levels of transformations such as model-to-model, model-to-text, and model-to-code.

Also, depending on the domain and the desired target platform, multiple levels of transformations might be required to transform a PIM into implementation artifacts on a target platform. For example, transformations may be required across models of the same type such as a transformation from one PSM to another PSM to add additional levels of refinement or across different levels of abstraction such as from PIM to PSM or from one type of model to another such as from PSM to code or even PIM to code. Traditional PIM to PSM and PSM to code transformations may be used as shown in FIG. 1. Operationally, multiple levels of transformations can be chained so that the intermediate results are invisible to the consumer of the transformations.

As mentioned above, one of the precursors to defining transformations is the availability of meta-models of the source and target domains or platforms for which transformations need to be specified. Often the source domain is more abstract than the target domain. In the exemplary embodiment of the present invention, the source domain meta-model is the meta-model of the elements shown in FIG. 2; i.e., the meta-model of UML 2.0, and the service level abstractions offered by the SOMA method and the created user experience model. If access to the meta-models of these elements is available, then the meta-model of the PIM is relatively well understood.

One of the challenges in realizing the model driven transformations is knowing the meta-model of the target platform. In cases where the target platforms are proprietary, extracting the meta-model of the target platform can be an engineering challenge. For example, the meta-models of SAP NetWeaver's WebDynPro and Guided Procedures modules are unpublished and are difficult to create without exemplars. Working with concrete models is more intuitive for most developers than to work with meta-models. Therefore, best practice suggests that an exemplar be created and then the meta-model is reverse engineered from the exemplar. An exemplar is an example solution that one would like the transformations to produce. This means that an exemplar has to be completed with at least one instance of all types of possible model elements. An exemplar could be a single xml file or a collection of code artifacts (such as java files) or a combination. In addition, creating an exemplar helps to obtain a picture of what needs to be produced. Once an exemplar is created, a meta-model can be extracted therefrom using various code-to-schema extraction tools.

Figure 6A:
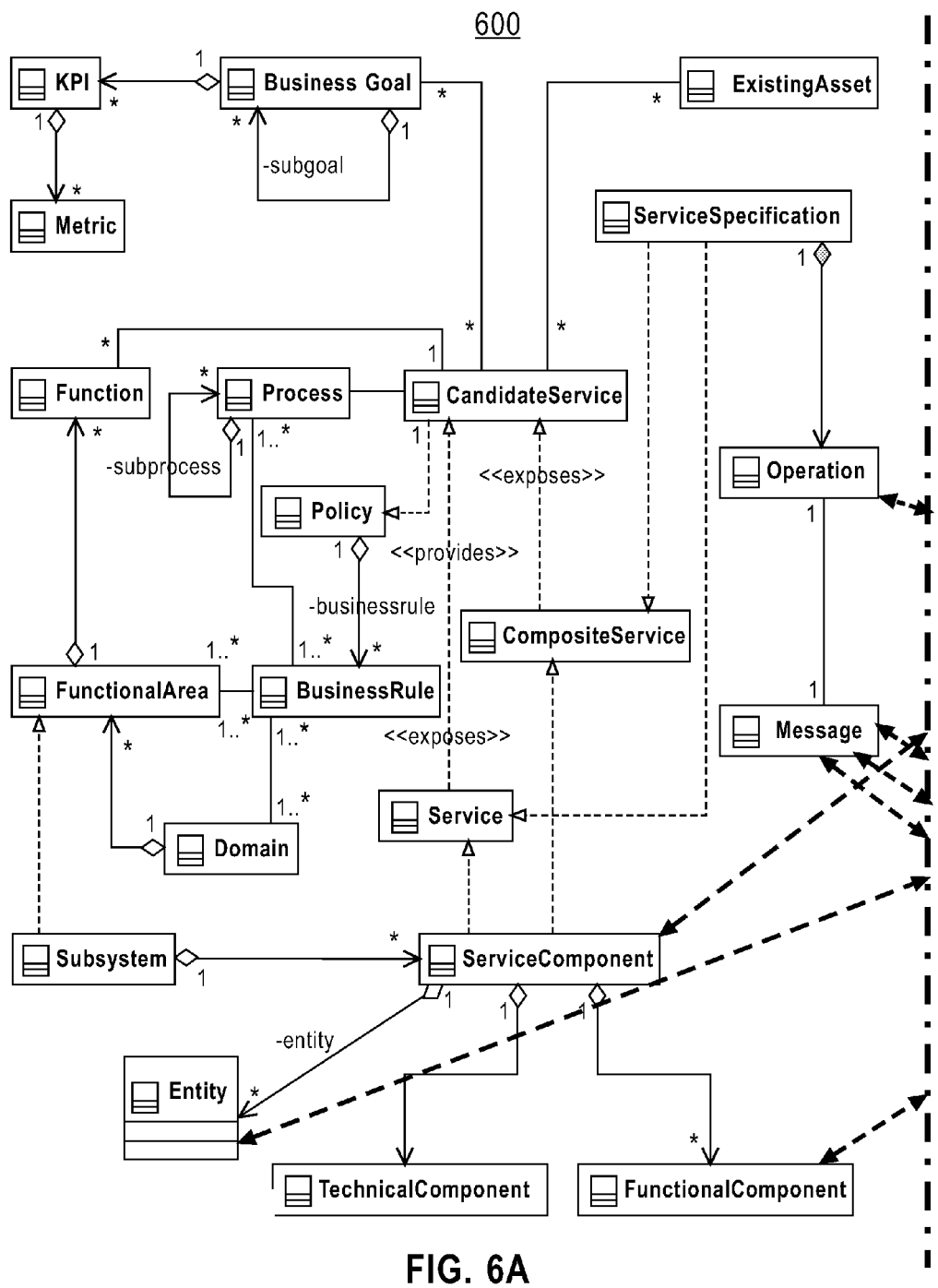
FIG. 6, including FIGS. 6a and 6b, and FIG. 7, including
Figure 6B:
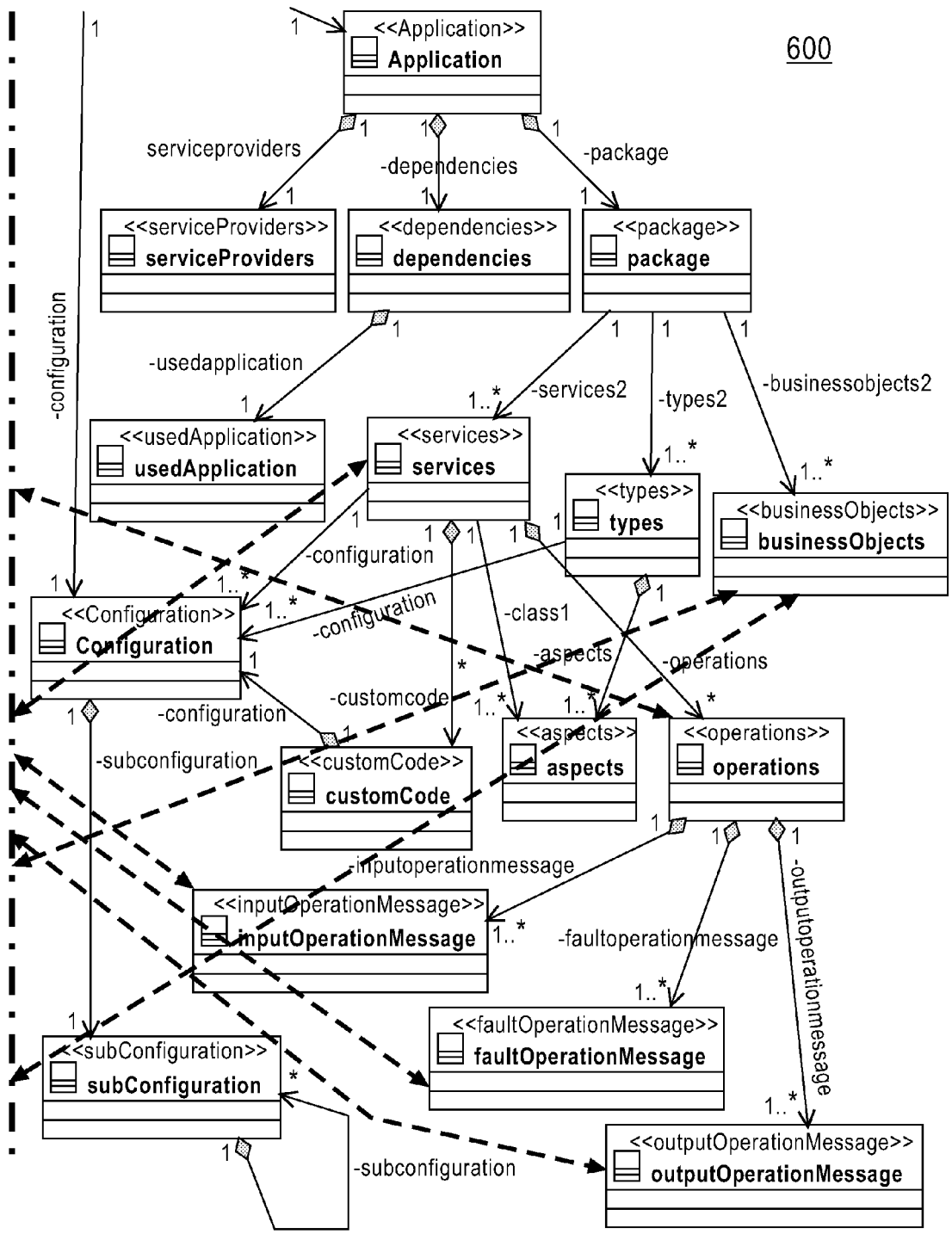
Figure 7A:
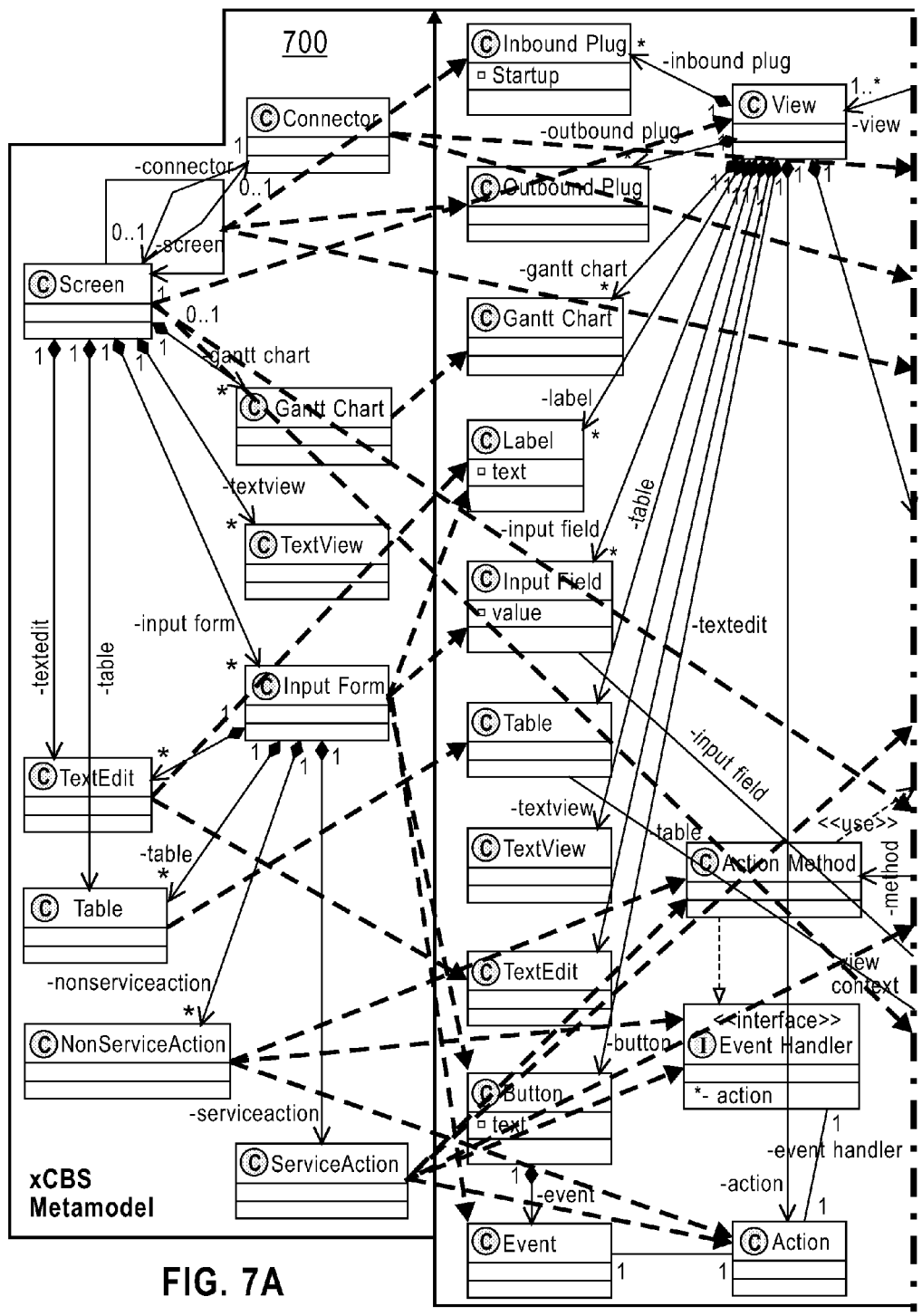
FIGS. 7a and 7b, illustrate the transformation rules between the meta-models of the PIM and the SAP NetWeaver composite application framework PSM.
Figure 7B:
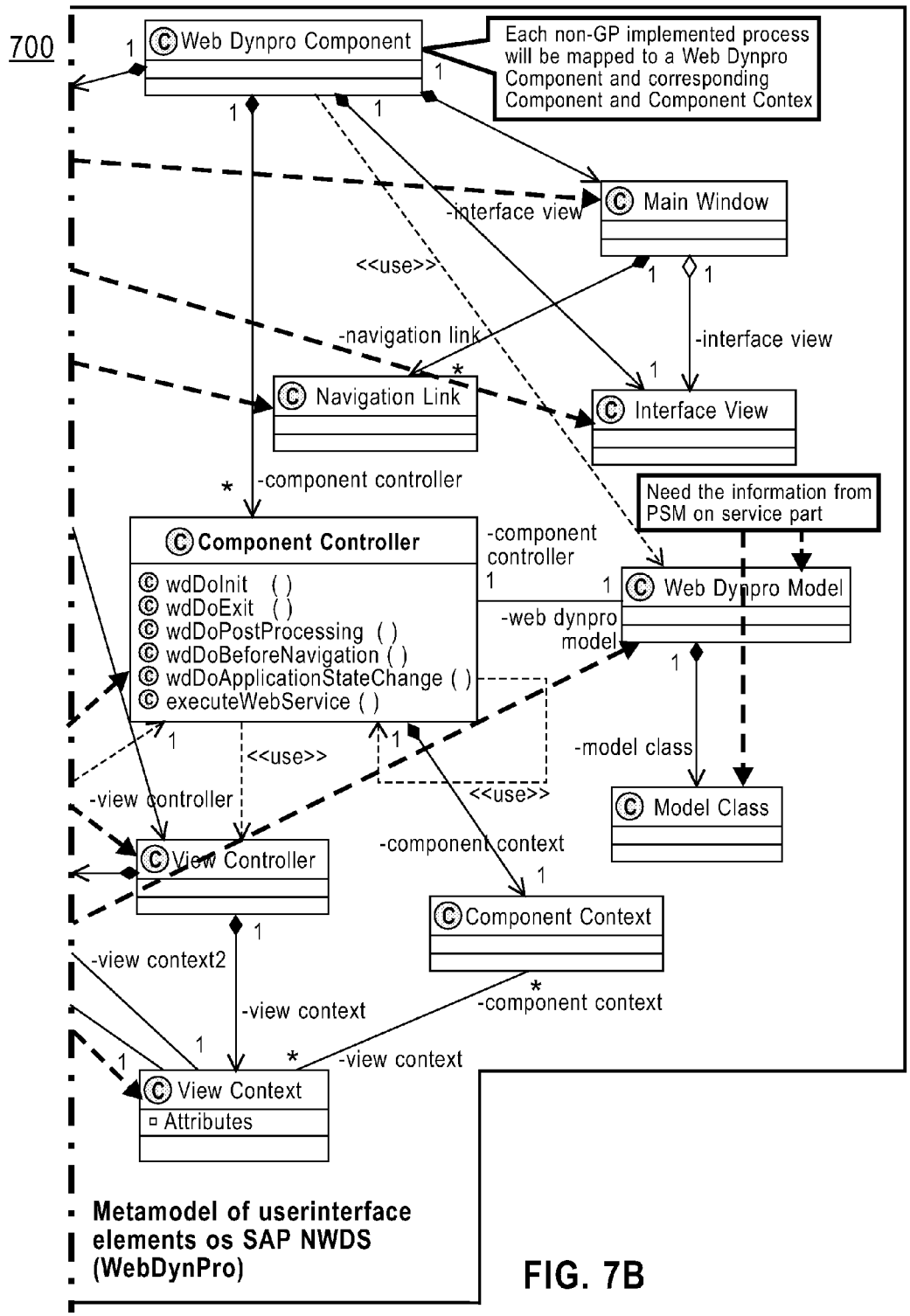
Figure 8:
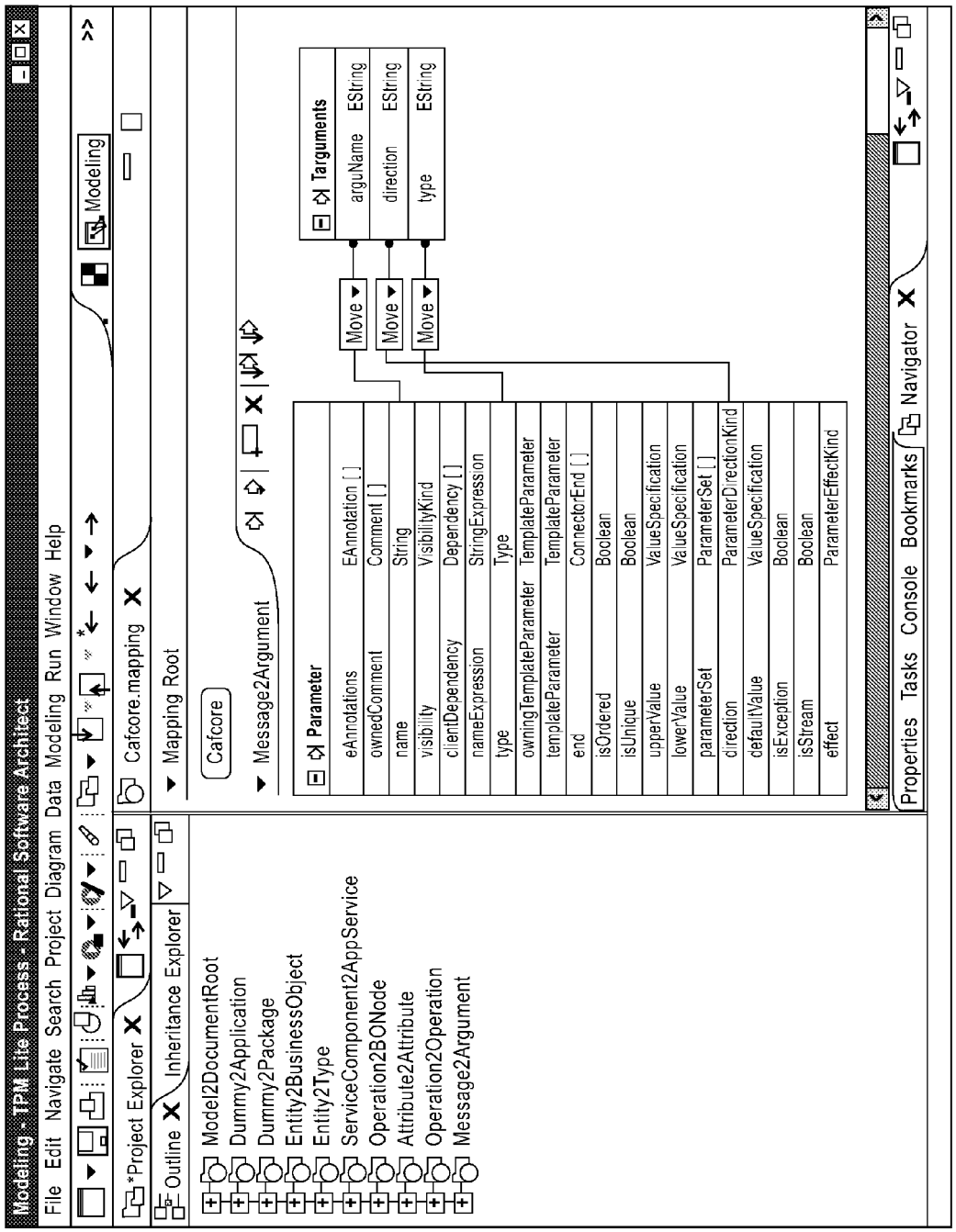
FIG. 8 shows how the transformation mapping rules of FIGS. 6 and 7 may be developed, for example, using the IBM RSA transformation authoring tool.

FIGS. 6 and 7 illustrate the transformation rules between the meta-models of the PIM and the SAP NetWeaver composite application framework (CAF). Specifically, FIG. 6 shows the transformation mappings 600 between the service elements of the meta-models of the PIM and the SAP CAF PSM. FIG. 7 shows the transformation mappings 700 between the user experienced meta-model and the SAP NetWeaver WebDynPro module. FIG. 8 shows how these transformation mapping rules may be developed, for example, using the IBM RSA transformation authoring tool. The transformation rules may be developed manually through observation and domain analysis. Automated ways of deriving transformation rules are being researched.

Figure 9:
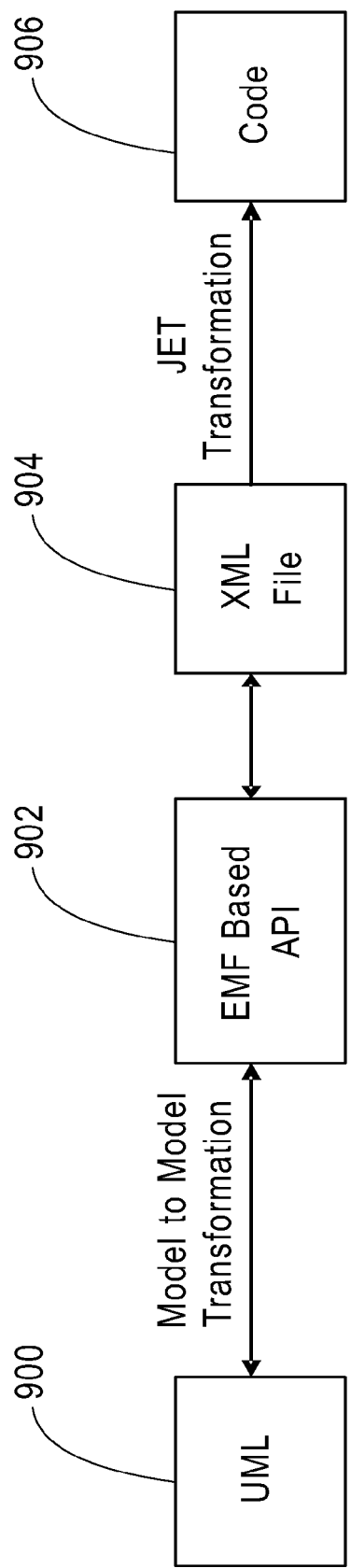
FIG. 9 illustrates an operational version of the method of FIG. 1.

Generating implementation artifacts from platform specific models can save time and effort in application development. As mentioned above, implementation artifacts can be code, database schema, user interface pages, etc. Different vendors offer different tools for code generation depending on the type of code artifacts to be generated and the programming language in which the code is to be generated. In the exemplary embodiment of the present invention, Java code and database schema elements may be generated for both IBM WebSphere and SAP NetWeaver platforms. For this the Eclipse Modeling Framework (EMF)'s Java Emitter Templates (JET) may be used. The transformations to generate code and other artifacts become complex rather quickly. The EMF project offers template based solution to manage complexity during code generation, while JET uses Java Server Pages (JSP) like syntax and enables one to write templates that express the code that one wants to generate. JET is a generic template engine that can be used to generate SQL, XML, Java source code and other output from templates. FIG. 9 illustrates an operational version of FIG. 1 and provides specific technology choices used in the exemplary embodiment of the present invention. The PIM 900 is expressed in UML, as described above. The PSM 902 comprises an EMF-based API, that is converted to an XML file 904 and then the artifacts 906 (e.g., the code) are generated. As mentioned earlier, the model-to-model and model-to-code generation transformations are typically chained so that the two-step process is transparent to the user. Once the transformations have been written and tested, the next step is to run the transformations.

The transformations created using mapping rules (FIGS. 6-7) and codified using a tool such as the one illustrated in FIG. 8 can then be run by creating a specific instance of the transformation and by supplying it with a specific instance of the source model, for example, the trade promotions management PIM in the exemplary embodiment of the present invention. The output of this transformation is implementation artifacts on the target platform. A platform specific model is an intermediary output of this chained two-step transformation.

The disclosure to this point has focused on how models can be transformed into implementation artifacts via transformations. In a real client environment, unless the business processes are being developed for the first time as a "greenfield" activity on a clean slate, there is typically some legacy code that needs to be reused or integrated while developing changed or updated business processes. Therefore, the implementation artifacts that are generated have to leverage these existing implementation assets. MDA and MDD techniques generally do not specifically discuss leveraging existing assets during transformation authoring.

Figure 10:
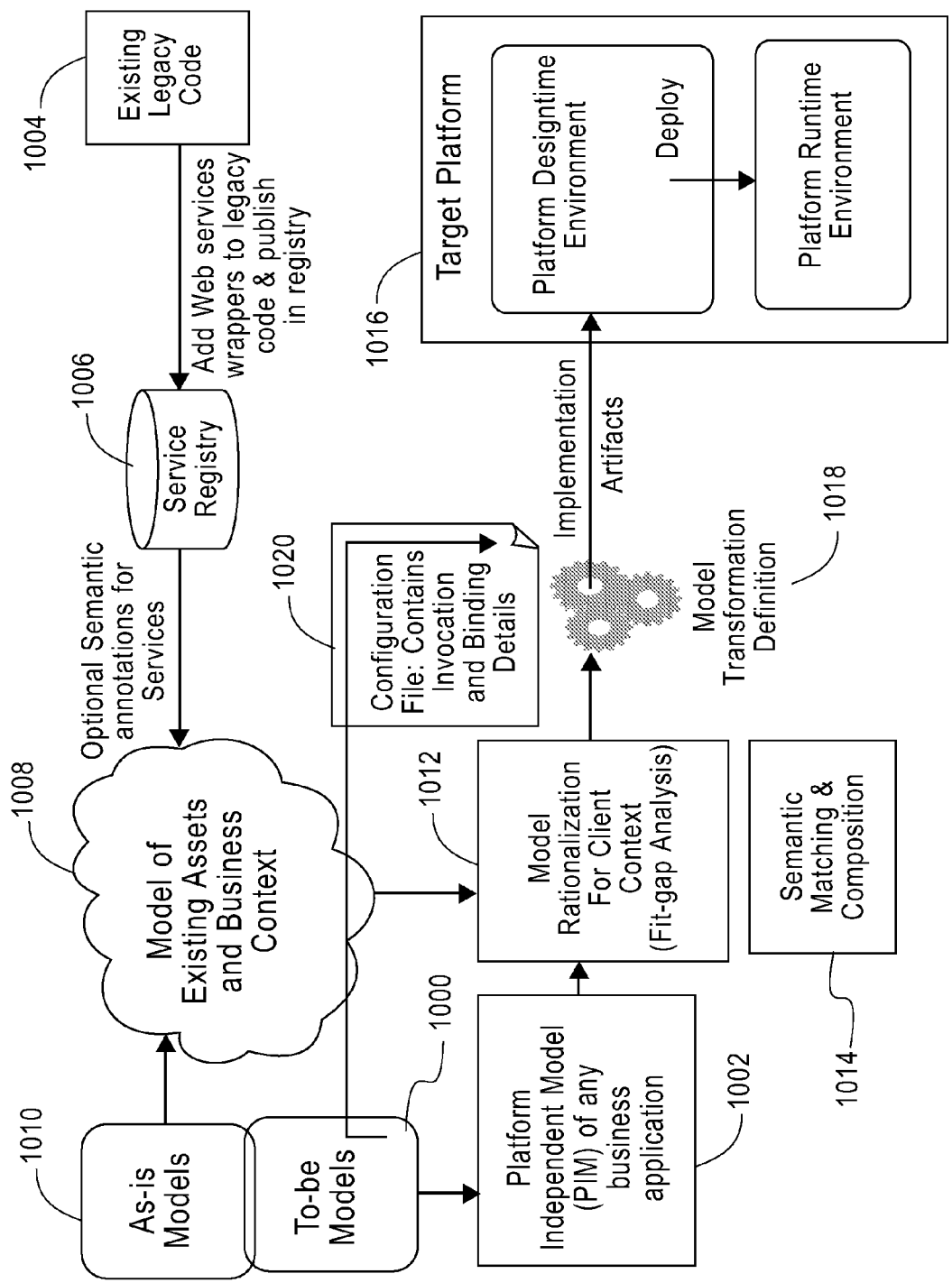
FIG. 10 illustrates a model-driven development approach for existing client assets, in accordance with an exemplary embodiment of the present invention.

FIG. 10 illustrates an approach for leveraging these existing client assets, in accordance with an exemplary embodiment of the present invention. The platform independent models discussed so far can also be referred to as "to-be" models 1000. They indicate the "to-be" state for a given set of business process. If PIM models have been created in a non-UML form using various vendor tools, it may be possible to perform a PIM to PIM transformation to obtain the PIM model 1002 in a desirable form. By using SOA-enablement principles, existing legacy code 1004 can be wrapped as Web services and made available for discovery and integration via the services registry 1006. These services in the registry combined with any other documented or derived process models forms a model 1008 of existing assets. If "as-is" models 1010 exist (which describe the as-is state of the client environment) are not in the desired format, then PSM to PSM transformations can be applied to convert the models to the desired model format 1008. Once the to-be models 1000 and the as-is models 1010 (i.e., existing models) are obtained, the models are rationalized 1012 to note which of the existing services can be leveraged for implementing the defined service interfaces in the to-be models. Model rationalization involves matching existing assets/services in a client setting with modeled and exposed services in the PIM and then generating the details for how to bind to these existing assets/services while generating the composite application artifacts. Semantic Web service discovery matching, mapping and composition techniques 1014 are applied to discover suitable service implementations for modeled services. If the client environment has existing services that can be leveraged, then the specific interface mappings between the services interfaces in the to-be PIM models and the legacy services (from the as-is models) in the service registry are generated by a semantic matching engine. These mappings are passed as inputs into the transformation along with the remaining PIM to PSM transformation mapping rules already specified. Using this approach, when transformations generate implementation artifacts, they are already bound to the existing services in the target platform 1016. The model transformation definition 1018 reads the matching and mapping details from the configuration file 1020 generated by fit-gap analysis and generates the code artifacts with appropriate bindings.

The semantic discovery, matching, mapping and composition technology resolves semantic ambiguities in the descriptions of Web service interfaces by combining information retrieval and semantic Web techniques. Information retrieval techniques are used to resolve the domain-independent relationships. For example, in this approach semantic similarity is derived using an English thesaurus after "tokenization" and part-of-speech tagging of the names of the elements that describe the interfaces of Web services. Semantic Web techniques are used to resolve domain-specific similarities. For example, the concepts used in a given domain (such as retail industry, health-care industry, etc.) and the relationships among them are modeled as domain ontology. The Web services can be optionally annotated using semantic annotations from the domain ontologies in Semantic Annotations for WSDL (SAWSDL) format. Then the ontological similarity of the semantic annotations associated with Web service descriptions is derived by inferring the domain ontology. Matches from the two approaches are combined to determine an overall similarity score to help assess the quality of a Web service match to a given request. In cases where single services do not match a given request, the system can compose multiple services by employing artificial intelligence (AI) planning algorithms in order to fulfill a given request.

The semantic Web service matching framework for (semi)-automatically discovers existing assets from repositories and leverages them during the generation of implementation artifacts. This is done by creating automatic bindings to service implementations from modeled service interfaces. This work can be extended to include rationalization of not just services but processes as well. This involves comparing and matching not just services but all types of models such as behavioral, interaction and structural models of UML.

Figure 11A:
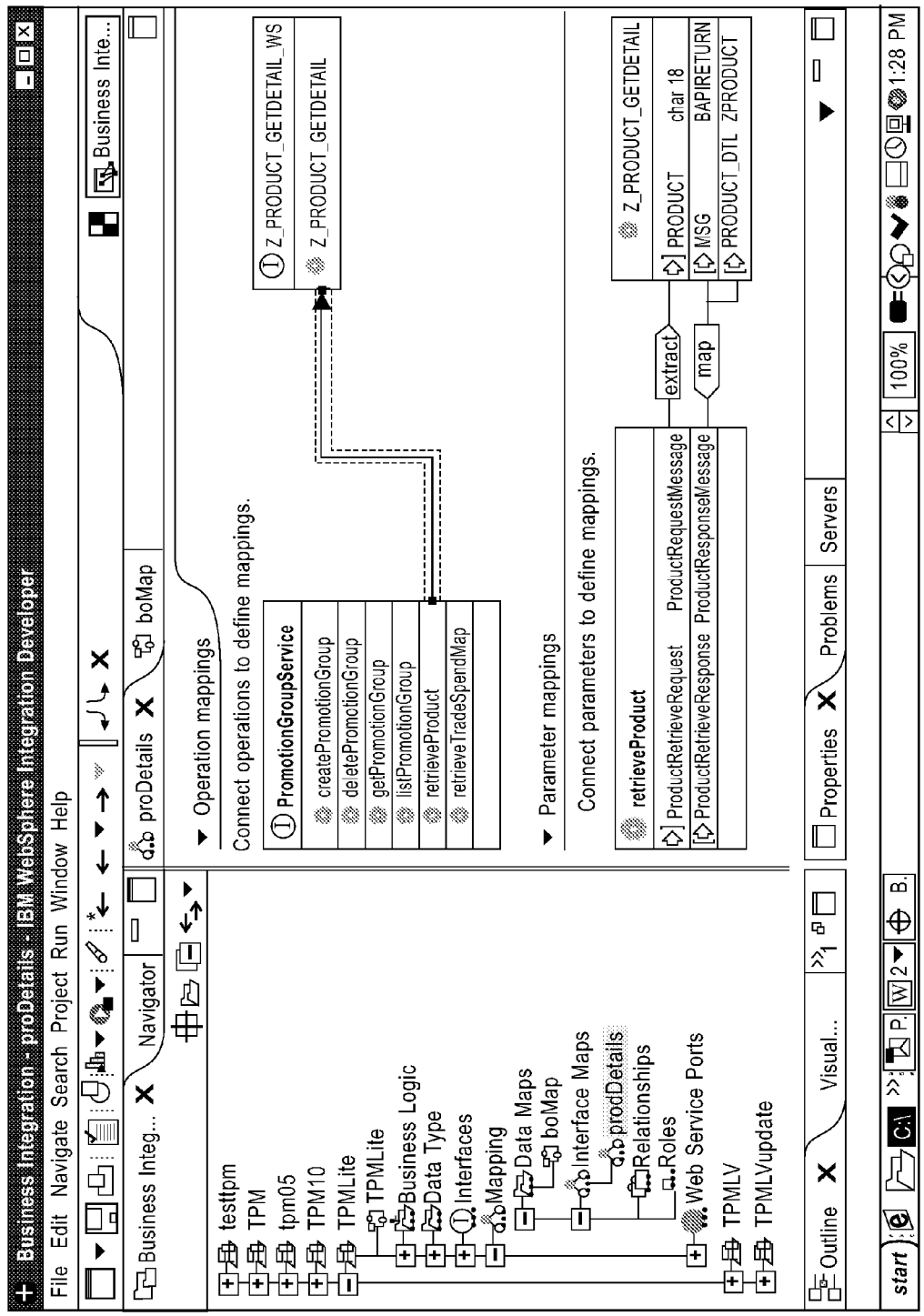
FIGS. 11a and 11b, illustrate the Web service interface mappings between one of the modeled services in the PIM and one of the existing legacy services of a client environment in the trade promotions management scenario of the exemplary embodiment of the present invention.
Figure 11B:
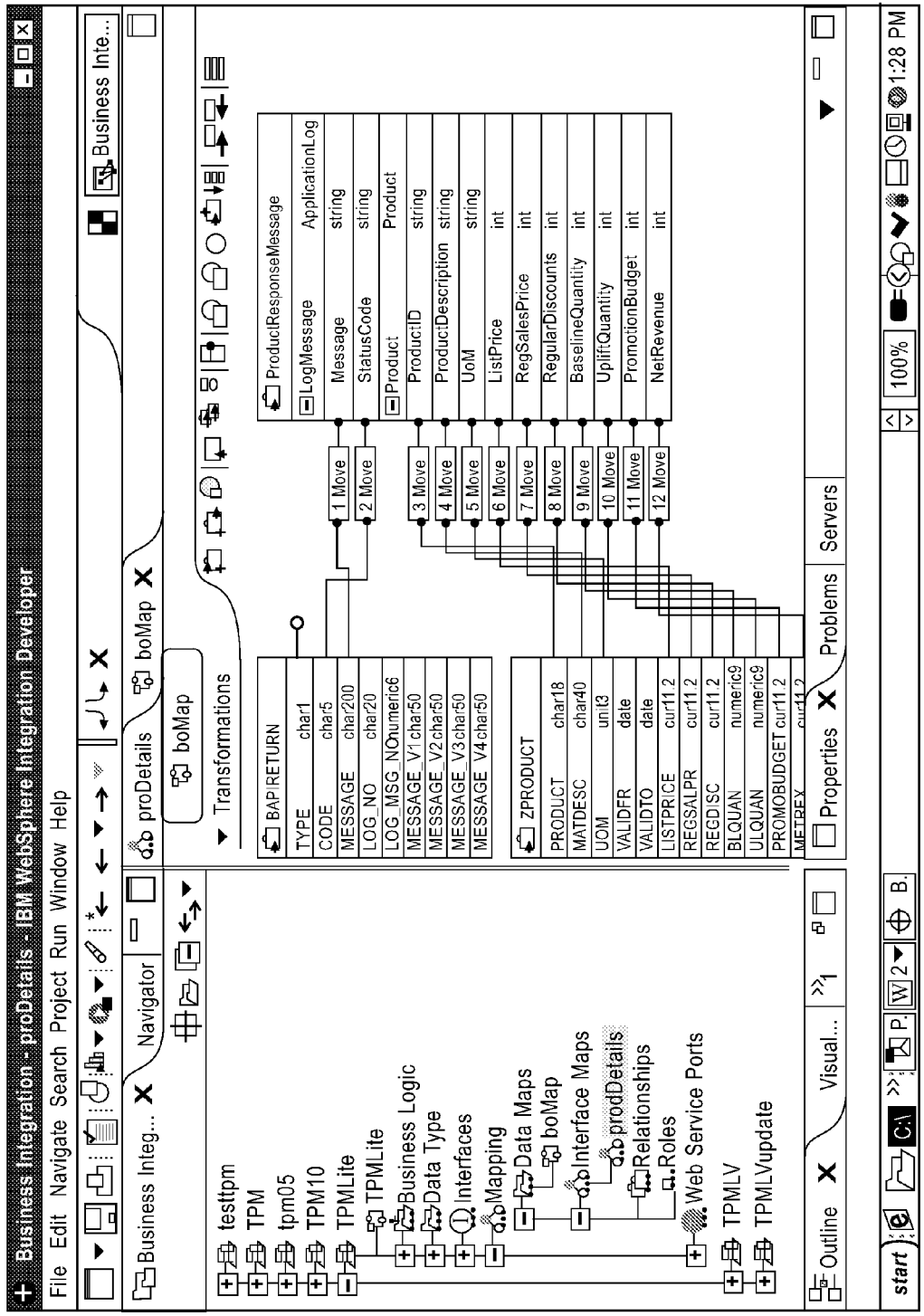

FIGS. 11a and 11b illustrate the Web service interface mappings between one of the modeled services in the PIM and one of the existing legacy services of a client environment in the trade promotions management scenario using the system and method of the present invention.

Figure 12:
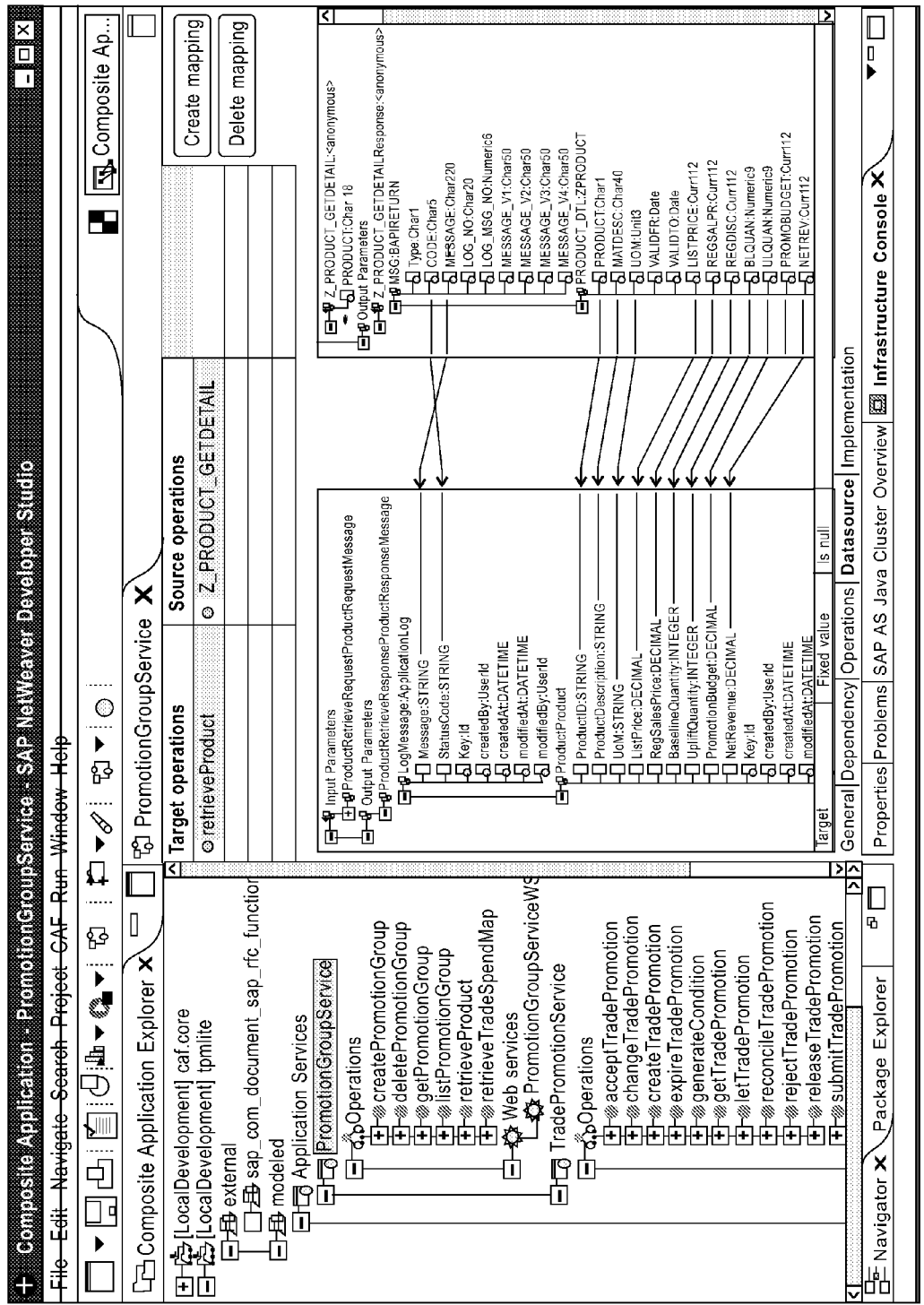
FIG. 12 shows artifacts generated on the SAP NetWeaver platform.
Figure 13:
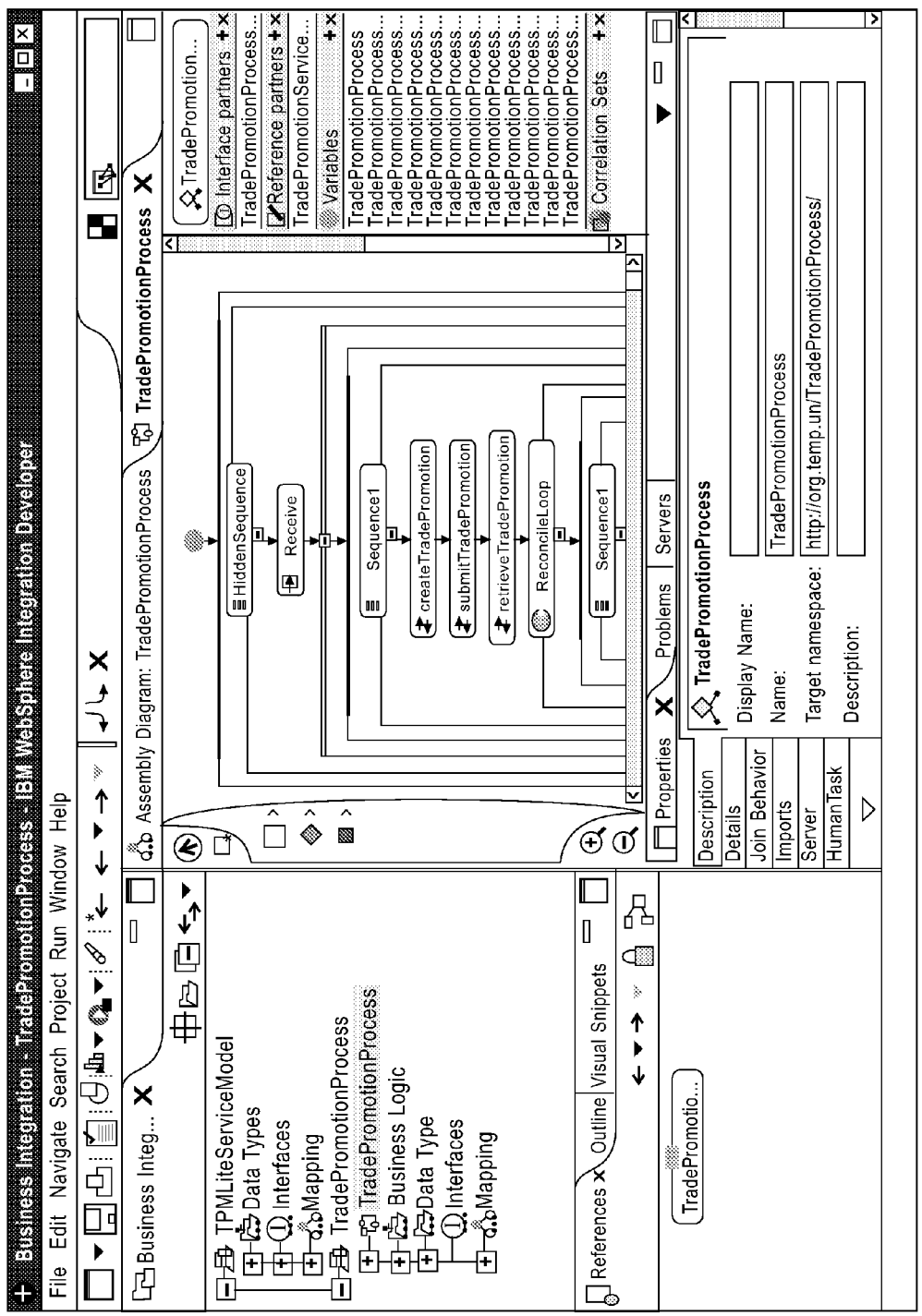
FIG. 13 shows artifacts generated on the IBM WebSphere Integration Developer (WID) platform.

FIG. 12 shows the generated artifacts in SAP NetWeaver platform as a result of running the transformations. It includes the exposed services, their messages, interfaces and the corresponding business objects. FIG. 13 shows the generated artifacts on IBM WebSphere Integration Developer (WID) platform.

Figure 14:
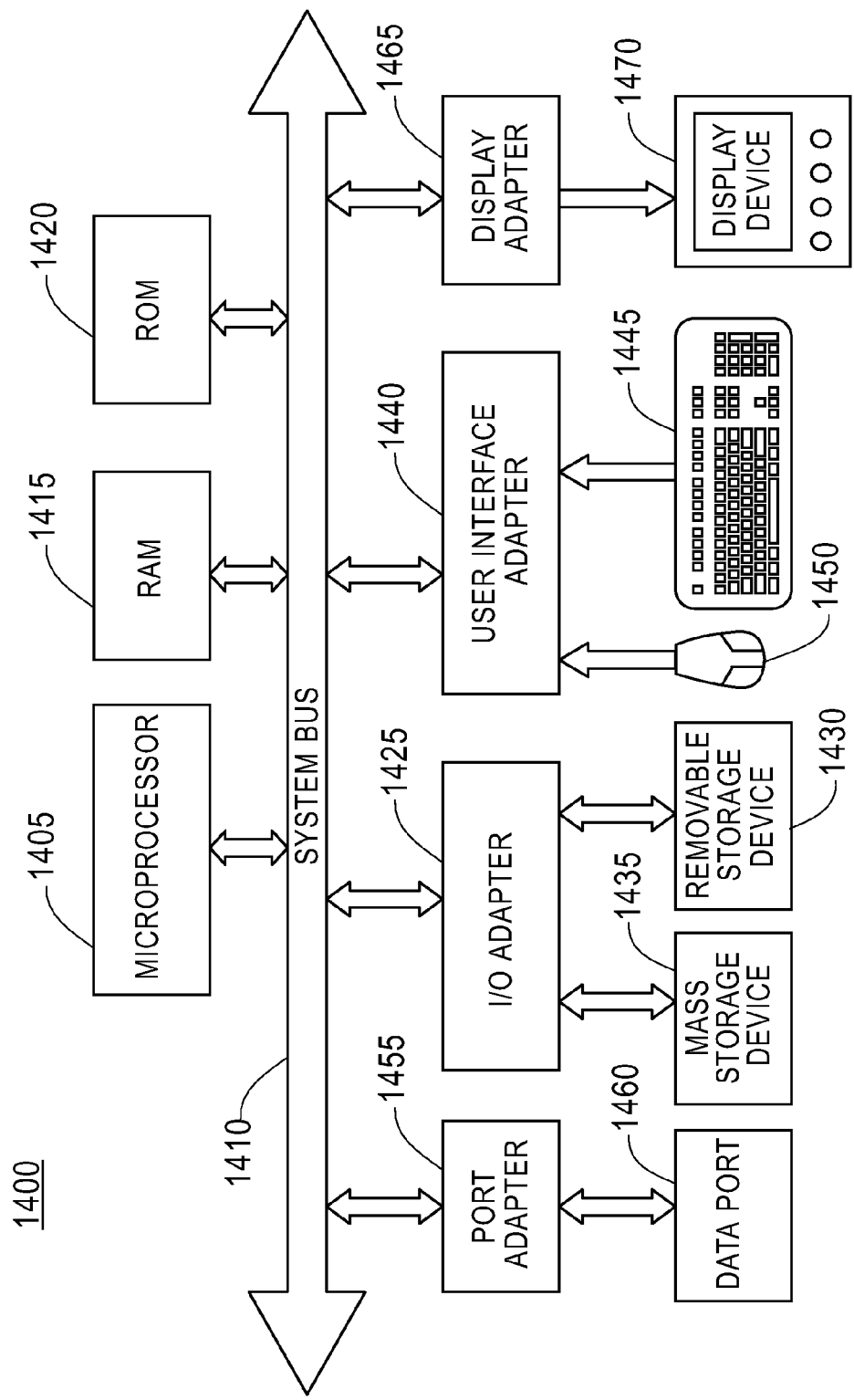
FIG. 14 is a schematic block diagram of a general-purpose computer suitable for practicing embodiments of the present invention.

Generally, the method embodiments for generating implementation artifacts for contextually-aware business applications may be practiced with a general-purpose computer and the method may be coded as a set of instructions on removable or hard media for use by the general-purpose computer. FIG. 14 is a schematic block diagram of a general-purpose computer suitable for practicing embodiments of the present invention. In FIG. 14, computer system 1400 has at least one microprocessor or central processing unit (CPU) 1405. CPU 1405 is interconnected via a system bus 1410 to a random access memory (RAM) 1415, a read-only memory (ROM) 1420, an input/output (I/O) adapter 1425 for a connecting a removable data and/or program storage device 1430 and a mass data and/or program storage device 1435, a user interface adapter 1440 for connecting a keyboard 1445 and a mouse 1450, a port adapter 1455 for connecting a data port 1460 and a display adapter 1465 for connecting a display device 1470.

ROM 1420 contains the basic operating system for computer system 1400. The operating system may alternatively reside in RAM 1415 or elsewhere as is known in the art. Examples of removable data and/or program storage device 1430 include magnetic media such as floppy drives and tape drives and optical media such as CD ROM drives. Examples of mass data and/or program storage device 1435 include hard disk drives and non-volatile memory such as flash memory. In addition to keyboard 1445 and mouse 1450, other user input devices such as trackballs, writing tablets, pressure pads, microphones, light pens and position-sensing screen displays may be connected to user interface 1440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 1430, fed through data port 1460 or typed in using keyboard 1445.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIGS. 1, 9 and 10.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for generating implementation artifacts for contextually-aware business applications, the method comprising:
    utilizing a platform independent model (PIM) of a business application;
    creating a specific interface mapping between an existing service of the business application and the PIM;
    generating a platform specific model (PSM) from the PIM and the specific interface mapping, wherein the generating of a PSM includes one or more transformations between one or more meta-models of the PIM and one or more meta-models of the generated PSM;
    generating implementation artifacts; and
    binding the generated implementation artifacts with the existing services of the business application;
    wherein binding the generated implementation artifacts with the existing services includes applying a semantic matching algorithm to automatically bind the generated implementation artifacts with the existing services of the business application,
    wherein when at least one of the one or more meta-models of the PIM or at least one of the one or more meta-models of the generated PSM are unknown, further comprising creating for each of the unknown meta-models an exemplar that corresponds to the unknown meta-model, and reverse-engineering a known meta-model from the exemplar that corresponds to the unknown meta-model.

2. The method of claim 1, wherein utilizing a PIM comprises creating a PIM of a business application.

3. The method of claim 1, wherein the PIM is one of the group comprising a process model, a user experience model, and application services that are chosen to be exposed to external parties.

4. The method of claim 1, wherein the one or more transformations between service elements of one or more meta-models of the PIM and service elements of one or more meta-models of the generated PSM include one or more mappings that define rules for mapping between the service elements of elements of one or more meta-models of the PIM and the service elements of one or more meta-models of the generated PSM.

5. The method of claim 1, wherein generating implementation artifacts includes rationalizing the PIM and the PSM, wherein rationalizing includes matching any existing services of the business application with modeled and exposed services in the PIM.

6. The method of claim 1, wherein creating a PIM includes creating a PIM in any formal modeling language.

7. The method of claim 6, wherein the formal modeling language comprises the Unified Modeling Language (UML).

8. A computer program product, comprising:
    a computer readable computer program code for generating implementation artifacts for contextually-aware business applications stored on one or more non-transitory computer memory storage devices; and
    instructions for causing a computer to implement a method, the method further including:
    utilizing a platform independent model (PIM) of a business application;
    creating a specific interface mapping between an existing service of the business application and the PIM;
    generating a platform specific model (PSM) from the PIM and the specific interface mapping, wherein the generating of a PSM includes one or more transformations between one or more recta-models of the PIM and one or more recta-models of the generated PSM;
    generating implementation artifacts; and
    binding the generated implementation artifacts with the existing services of the business application,
    wherein binding the generated implementation artifacts with the existing services includes applying a semantic matching algorithm automatically bind the generated implementation artifacts with the existing services of the business application,
    wherein when at least one of the one or more meta-models of the PIM or at least one of the one or more meta-models of the generated PSM are unknown, further comprising creating for each of the unknown meta-models an exemplar that corresponds to the unknown meta-model, and reverse-engineering a known meta-model from the exemplar that corresponds to the unknown meta-model.

9. The computer program product of claim 8, wherein utilizing a PIM comprises creating a PIM of a business application.

10. The computer program product of claim 8, wherein the PIM is one of the group comprising a process model, a user experience model, and application services that are chosen to be exposed to external third parties.

11. The computer program product of claim 8, wherein the one or more transformations between service elements of one or more meta-models of the PIM and service elements of one or more meta-models of the generated PSM include one or more mappings that define rules for mapping between the service elements of elements of one or more meta-models of the PIM and the service elements of one or more meta-models of the generated PSM.

12. The computer program product of claim 8, wherein generating implementation artifacts includes rationalizing the PIM and the PSM, wherein rationalizing includes matching any existing services of the business application with modeled and exposed services in the PIM.

13. The computer program product of claim 8, wherein creating a PIM includes creating a PIM in any formal modeling language.

14. A system for generating implementation artifacts for contextually-aware business applications, comprising:
   computing network including a processing device in communication with one or more non-transitory computer memory storage devices; and
   the computing network further configured to implement a method for generating implementation artifacts for contextually-aware business applications, the method further including:
   utilizing a platform independent model (PIM) of a business application;
   creating a specific interface mapping between an existing service of the business application and the PIM;
   generating a platform specific model (PSM) from the PIM and the specific interface mapping, wherein the generating of a PSM includes one or more transformations between one or more meta-models of the PIM and one or more meta-models of the generated PSM;
   generating implementation artifacts; and
   binding the generated implementation artifacts with any-the existing services of the business application,
   wherein binding the generated implementation artifacts with the existing services includes applying a semantic matching algorithm to automatically bind the generated implementation artifacts with the existing services of the business application,
   wherein when at least one of the one or more meta-models of the PIM or at least one of the one or more meta-models of the generated PSM are unknown, further comprising creating for each of the unknown meta-models an exemplar that corresponds to the unknown meta-model, and reverse-engineering a known meta-model from the exemplar that corresponds to the unknown meta-model.

15. The system of claim 14, wherein utilizing a PIM comprises creating a PIM of a business application.

16. The system of claim 14, wherein the PIM is one of the group comprising a process model, a user experience model, and application services that are chosen to be exposed to external parties.

17. The system of claim 14, wherein the one or more transformations between service elements of one or more meta-models of the PIM and service elements of one or more meta-models of the generated PSM include one or more mappings that define rules for mapping between the service elements of elements of one or more meta-models of the PIM and the service elements of one or more meta-models of the generated PSM.

18. The system of claim 14, wherein generating implementation artifacts includes rationalizing the PIM and the PSM, wherein rationalizing includes matching any existing services of the business application with modeled and exposed services in the PIM.

19. The system of claim 14, wherein creating a PIM includes creating a PIM in any form modeling language.

* * * * *